(12) United States Patent
Vivanco

(10) Patent No.: US 12,574,819 B2
(45) Date of Patent: Mar. 10, 2026

(54) SYSTEMS AND METHODS FOR DEFINING GEOFENCES VIA HEIGHT THRESHOLD ADJUSTMENTS

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 406 days.

(21) Appl. No.: 18/302,626

(22) Filed: Apr. 18, 2023

(65) Prior Publication Data

US 2024/0357461 A1 Oct. 24, 2024

(51) Int. Cl.
*H04W 36/32* (2009.01)
*H04W 36/00* (2009.01)

(52) U.S. Cl.
CPC ..... *H04W 36/328* (2023.05); *H04W 36/0058* (2018.08)

(58) Field of Classification Search
CPC . H04W 36/328; H04W 36/08; H04W 36/302; H04W 84/06; H04W 24/02; H04W 24/10; H04W 36/0058; H04W 36/0061; H04W 36/0085; H04W 36/0083; H04W 48/20; H04W 36/00835; H04W 36/008375; H04W 36/362
See application file for complete search history.

(56) References Cited

U.S. PATENT DOCUMENTS

| | | |
|---|---|---|
| 2017/0127332 A1 | 5/2017 | Axmon et al. |
| 2020/0037219 A1 | 1/2020 | Kumar et al. |
| 2020/0137646 A1* | 4/2020 | Shi ........................ H04W 24/10 |
| 2020/0236573 A1 | 7/2020 | Zhang et al. |
| 2021/0160749 A1 | 5/2021 | Lu et al. |
| 2022/0283595 A1* | 9/2022 | Zhang ...................... G08G 5/22 |
| 2022/0286866 A1 | 9/2022 | Liu et al. |
| 2022/0394500 A1 | 12/2022 | Geng et al. |
| 2022/0417865 A1 | 12/2022 | Venkatasubramanian et al. |
| 2023/0155764 A1 | 5/2023 | Sheng et al. |

(Continued)

FOREIGN PATENT DOCUMENTS

| | | |
|---|---|---|
| WO | 2019011427 A1 | 1/2019 |
| WO | 2024173427 A1 | 8/2024 |

*Primary Examiner* — Quoc Thai N Vu
(74) *Attorney, Agent, or Firm* — Guntin & Gust, PLC; Kenneth S. Kwan

(57) ABSTRACT

Aspects of the subject disclosure may include, for example, identifying a plurality of cells that are located within a threshold distance from location(s) in a designated area, for each cell, defining a respective height threshold that is less than a determined minimum supported aerial UE altitude, based on detecting that an aerial UE has transmitted, to a serving cell, a height-based measurement report that includes information regarding neighboring cells, obtaining data regarding height thresholds associated with the neighboring cells, wherein one or more of the neighboring cells is included in the plurality of cells, determining that each of the one or more of the neighboring cells has a height threshold that is less than the determined minimum supported altitude, and performing an action to prevent each of the one or more of the neighboring cells from being a handover target cell for the aerial UE. Other embodiments are disclosed.

20 Claims, 12 Drawing Sheets

IDENTIFYING A FIRST PLURALITY OF CELLS THAT ARE LOCATED WITHIN A FIRST THRESHOLD DISTANCE FROM ONE OR MORE LOCATIONS IN A DESIGNATED AREA — 271

FOR EACH CELL OF THE FIRST PLURALITY OF CELLS, DEFINING A RESPECTIVE HEIGHT THRESHOLD THAT IS LESS THAN A DETERMINED MINIMUM SUPPORTED AERIAL USER EQUIPMENT (UE) ALTITUDE — 272

BASED ON DETECTING THAT AN AERIAL UE HAS TRANSMITTED, TO A SERVING CELL, A HEIGHT-BASED MEASUREMENT REPORT THAT INCLUDES INFORMATION REGARDING NEIGHBORING CELLS OF THE SERVING CELL, OBTAINING DATA REGARDING HEIGHT THRESHOLDS ASSOCIATED WITH THE NEIGHBORING CELLS, WHEREIN ONE OR MORE OF THE NEIGHBORING CELLS IS INCLUDED IN THE FIRST PLURALITY OF CELLS — 273

DETERMINING THAT EACH OF THE ONE OR MORE OF THE NEIGHBORING CELLS HAS A HEIGHT THRESHOLD THAT IS LESS THAN THE DETERMINED MINIMUM SUPPORTED AERIAL UE ALTITUDE — 274

PERFORMING AN ACTION TO PREVENT EACH OF THE ONE OR MORE OF THE NEIGHBORING CELLS FROM BEING A HANDOVER TARGET CELL FOR THE AERIAL UE, THEREBY FACILITATING ADJUSTMENT OF A FLIGHT TRAJECTORY OF THE AERIAL UE SUCH THAT THE AERIAL UE AVOIDS APPROACHING THE DESIGNATED AREA — 275

270

(56)     References Cited

U.S. PATENT DOCUMENTS

| | | |
|---|---|---|
| 2024/0187900 A1 | 6/2024 | Phuyal et al. |
| 2024/0334260 A1 | 10/2024 | Vivanco |
| 2024/0334293 A1 | 10/2024 | Vivanco |
| 2024/0334363 A1 | 10/2024 | Saha et al. |
| 2024/0349155 A1 | 10/2024 | Stanczak et al. |
| 2024/0357394 A1 | 10/2024 | Vivanco |
| 2024/0357462 A1 | 10/2024 | Vivanco |
| 2024/0381071 A1 * | 11/2024 | Zhang .................. H04W 24/10 |

* cited by examiner

100

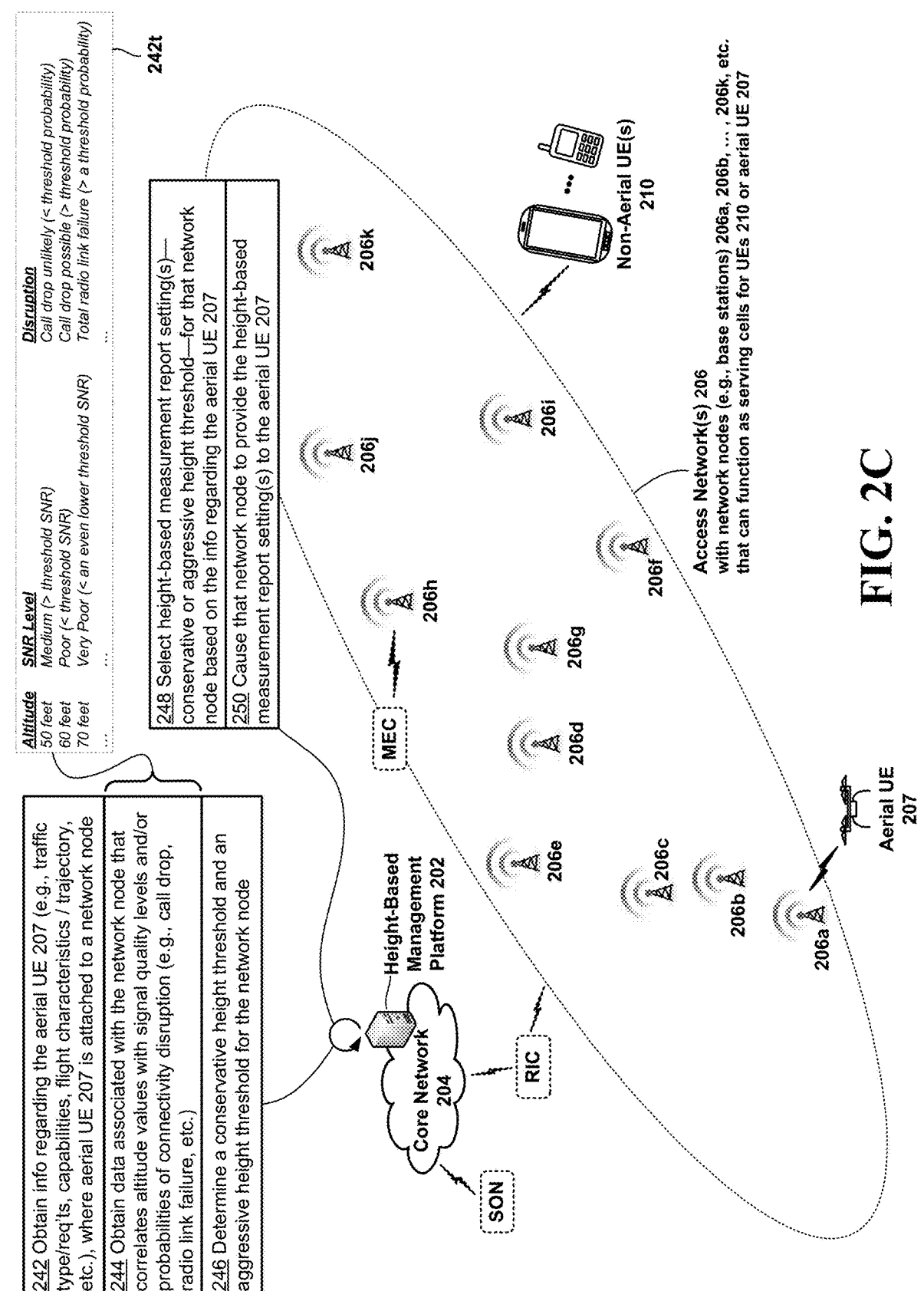

| Altitude | SNR Level | Disruption |
|---|---|---|
| 50 feet | Medium (> threshold SNR) | Call drop unlikely (< threshold probability) |
| 60 feet | Poor (< threshold SNR) | Call drop possible (> threshold probability) |
| 70 feet | Very Poor (< an even lower threshold SNR) | Total radio link failure (> a threshold probability) |
| ... | | ... |

242t

242 Obtain info regarding the aerial UE 207 (e.g., traffic type/req'ts, capabilities, flight characteristics / trajectory, etc.), where aerial UE 207 is attached to a network node 244 Obtain data associated with the network node that correlates altitude values with signal quality levels and/or probabilities of connectivity disruption (e.g., call drop, radio link failure, etc.)

246 Determine a conservative height threshold and an aggressive height threshold for the network node 248 Select height-based measurement report setting(s)—conservative or aggressive height threshold—for that network node based on the info regarding the aerial UE 207

250 Cause that network node to provide the height-based measurement report setting(s) to the aerial UE 207

Height-Based Management Platform 202

Core Network 204

SON

RIC

MEC

206a

206b

206c

206e

206d

206g

206h

206f

206j

206i

206k

Aerial UE 207

Non-Aerial UE(s) 210

Access Network(s) 206 with network nodes (e.g., base stations) 206a, 206b, ... , 206k, etc. that can function as serving cells for UEs 210 or aerial UE 207

FIG. 2C

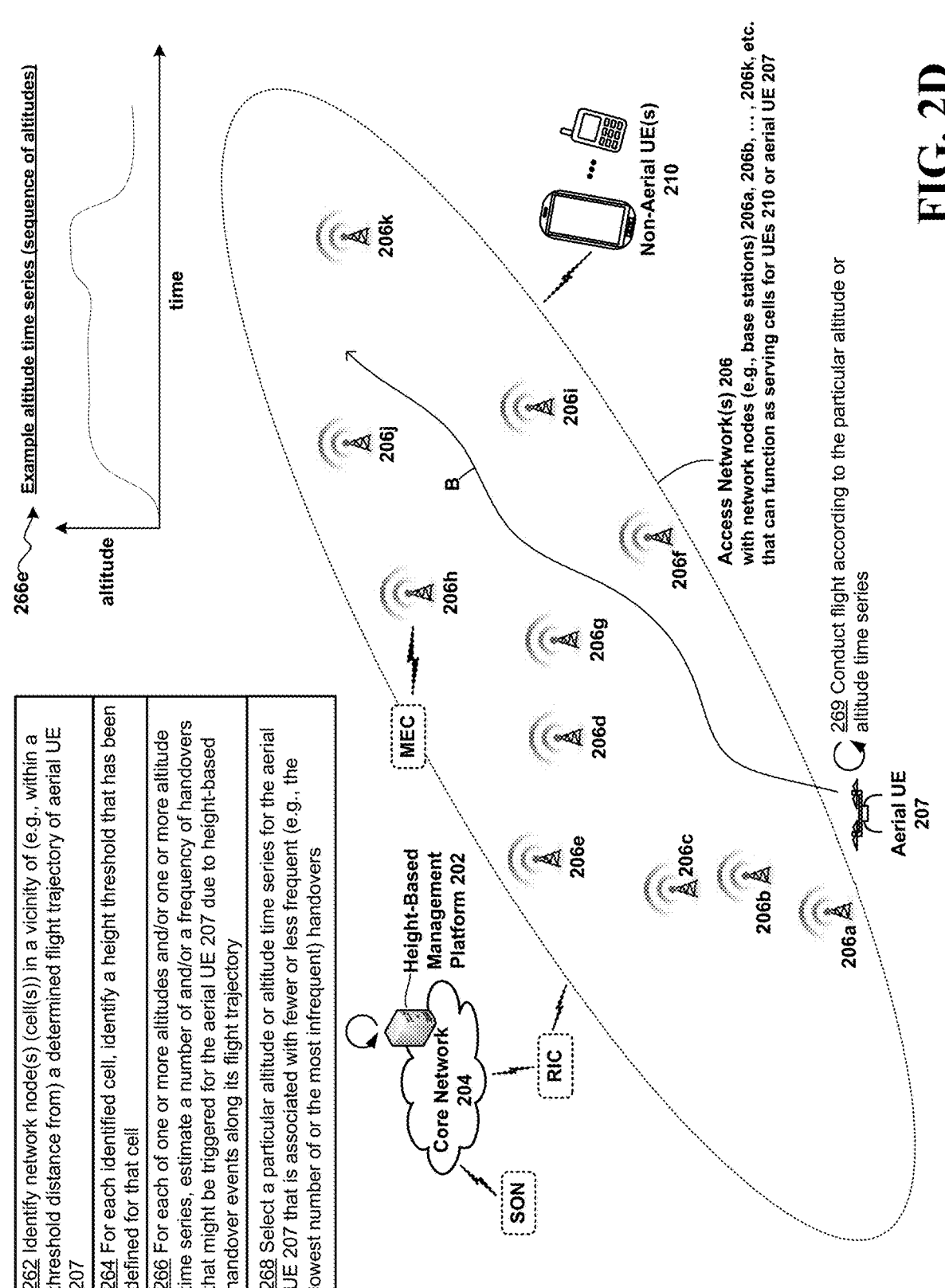

262 Identify network node(s) (cell(s)) in a vicinity of (e.g., within a threshold distance from) a determined flight trajectory of aerial UE 207

264 For each identified cell, identify a height threshold that has been defined for that cell 266 For each of one or more altitudes and/or one or more altitude time series, estimate a number of and/or a frequency of handovers that might be triggered for the aerial UE 207 due to height-based handover events along its flight trajectory 268 Select a particular altitude or altitude time series for the aerial UE 207 that is associated with fewer or less frequent (e.g., the lowest number of or the most infrequent) handovers 269 Conduct flight according to the particular altitude or altitude time series Height-Based Management Platform 202

Core Network 204

SON

RIC

MEC

Aerial UE 207

206a
206b
206c
206e
206d
206g
206h
206j
206i
206f
206k

B

Non-Aerial UE(s) 210

Access Network(s) 206 with network nodes (e.g., base stations) 206a, 206b, ..., 206k, etc. that can function as serving cells for UEs 210 or aerial UE 207

266e

Example altitude time series (sequence of altitudes)

altitude time

FIG. 2D

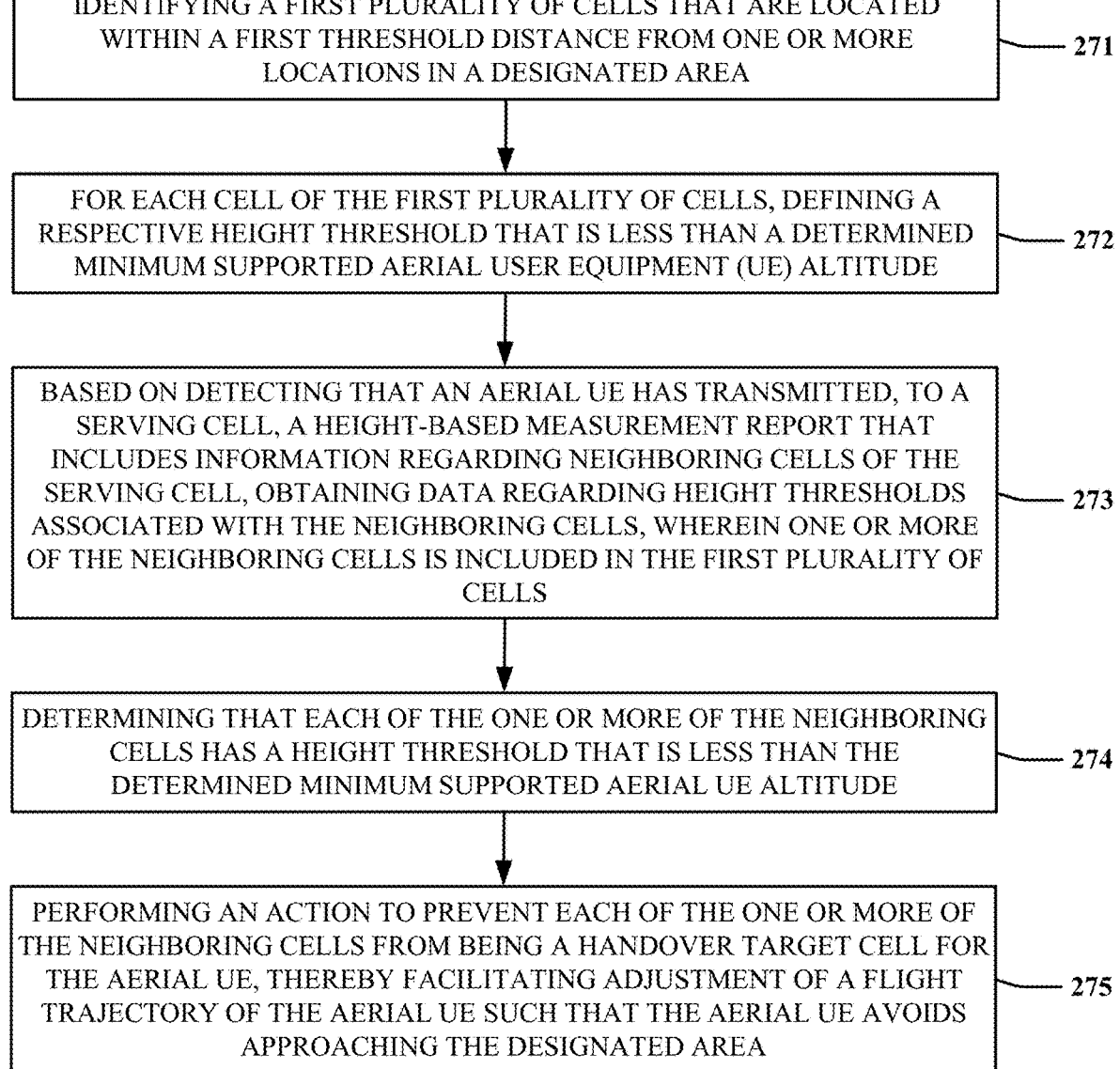

IDENTIFYING A FIRST PLURALITY OF CELLS THAT ARE LOCATED WITHIN A FIRST THRESHOLD DISTANCE FROM ONE OR MORE LOCATIONS IN A DESIGNATED AREA —— 271

FOR EACH CELL OF THE FIRST PLURALITY OF CELLS, DEFINING A RESPECTIVE HEIGHT THRESHOLD THAT IS LESS THAN A DETERMINED MINIMUM SUPPORTED AERIAL USER EQUIPMENT (UE) ALTITUDE —— 272

BASED ON DETECTING THAT AN AERIAL UE HAS TRANSMITTED, TO A SERVING CELL, A HEIGHT-BASED MEASUREMENT REPORT THAT INCLUDES INFORMATION REGARDING NEIGHBORING CELLS OF THE SERVING CELL, OBTAINING DATA REGARDING HEIGHT THRESHOLDS ASSOCIATED WITH THE NEIGHBORING CELLS, WHEREIN ONE OR MORE OF THE NEIGHBORING CELLS IS INCLUDED IN THE FIRST PLURALITY OF CELLS —— 273

DETERMINING THAT EACH OF THE ONE OR MORE OF THE NEIGHBORING CELLS HAS A HEIGHT THRESHOLD THAT IS LESS THAN THE DETERMINED MINIMUM SUPPORTED AERIAL UE ALTITUDE —— 274

PERFORMING AN ACTION TO PREVENT EACH OF THE ONE OR MORE OF THE NEIGHBORING CELLS FROM BEING A HANDOVER TARGET CELL FOR THE AERIAL UE, THEREBY FACILITATING ADJUSTMENT OF A FLIGHT TRAJECTORY OF THE AERIAL UE SUCH THAT THE AERIAL UE AVOIDS APPROACHING THE DESIGNATED AREA —— 275

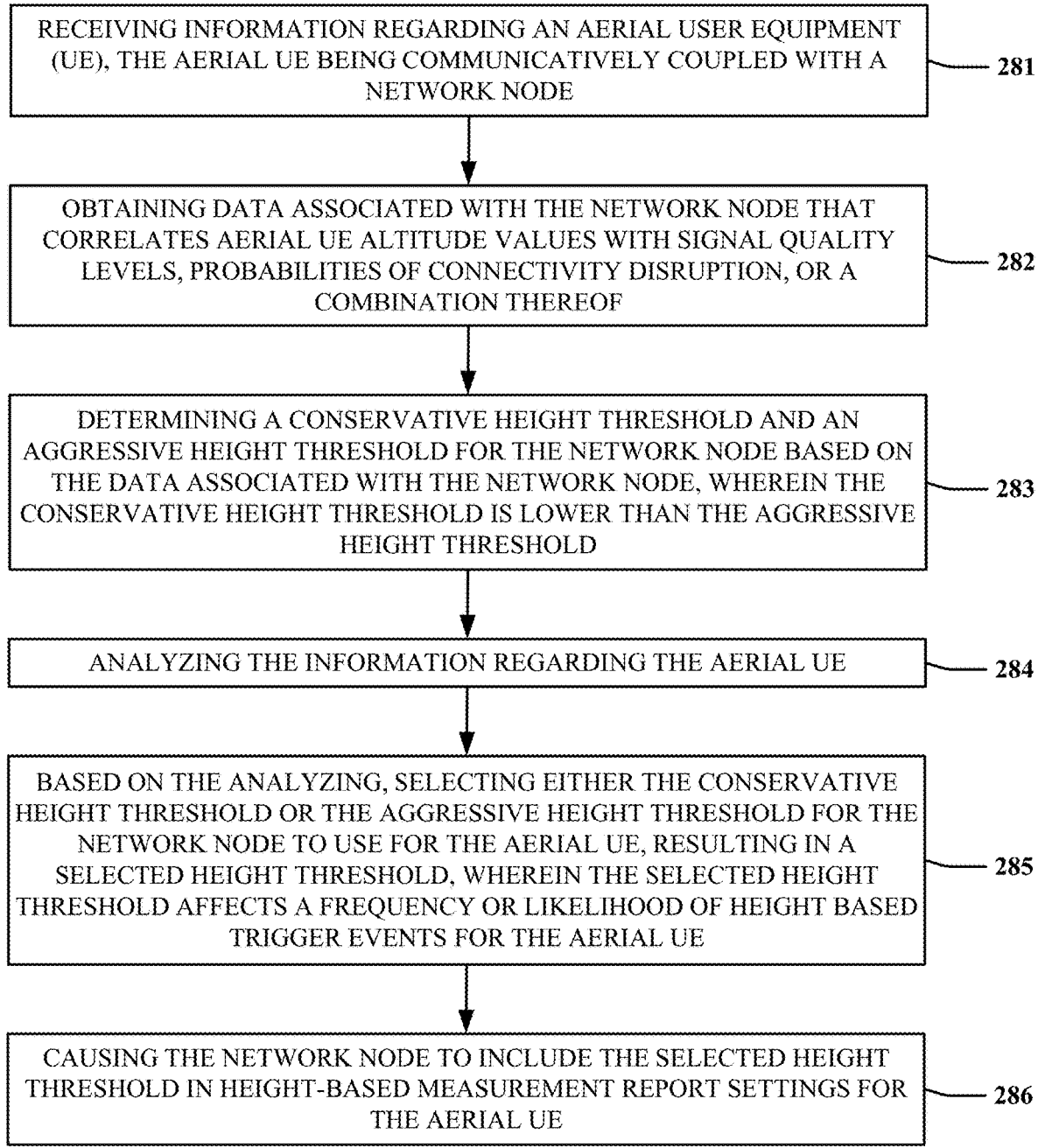

RECEIVING INFORMATION REGARDING AN AERIAL USER EQUIPMENT (UE), THE AERIAL UE BEING COMMUNICATIVELY COUPLED WITH A NETWORK NODE — 281

OBTAINING DATA ASSOCIATED WITH THE NETWORK NODE THAT CORRELATES AERIAL UE ALTITUDE VALUES WITH SIGNAL QUALITY LEVELS, PROBABILITIES OF CONNECTIVITY DISRUPTION, OR A COMBINATION THEREOF — 282

DETERMINING A CONSERVATIVE HEIGHT THRESHOLD AND AN AGGRESSIVE HEIGHT THRESHOLD FOR THE NETWORK NODE BASED ON THE DATA ASSOCIATED WITH THE NETWORK NODE, WHEREIN THE CONSERVATIVE HEIGHT THRESHOLD IS LOWER THAN THE AGGRESSIVE HEIGHT THRESHOLD — 283

ANALYZING THE INFORMATION REGARDING THE AERIAL UE — 284

BASED ON THE ANALYZING, SELECTING EITHER THE CONSERVATIVE HEIGHT THRESHOLD OR THE AGGRESSIVE HEIGHT THRESHOLD FOR THE NETWORK NODE TO USE FOR THE AERIAL UE, RESULTING IN A SELECTED HEIGHT THRESHOLD, WHEREIN THE SELECTED HEIGHT THRESHOLD AFFECTS A FREQUENCY OR LIKELIHOOD OF HEIGHT BASED TRIGGER EVENTS FOR THE AERIAL UE — 285

CAUSING THE NETWORK NODE TO INCLUDE THE SELECTED HEIGHT THRESHOLD IN HEIGHT-BASED MEASUREMENT REPORT SETTINGS FOR THE AERIAL UE — 286

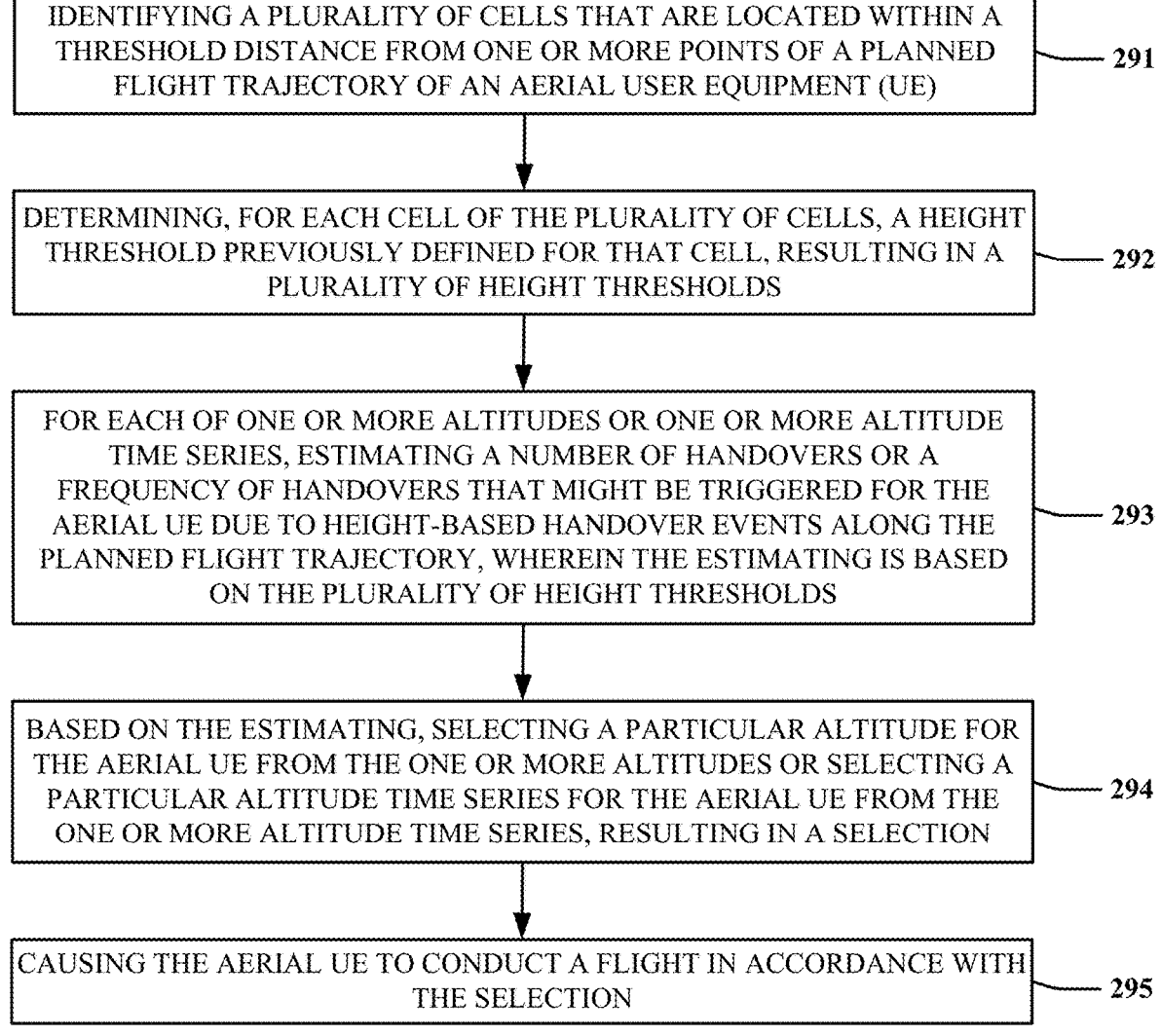

IDENTIFYING A PLURALITY OF CELLS THAT ARE LOCATED WITHIN A THRESHOLD DISTANCE FROM ONE OR MORE POINTS OF A PLANNED FLIGHT TRAJECTORY OF AN AERIAL USER EQUIPMENT (UE) ⎯ 291

DETERMINING, FOR EACH CELL OF THE PLURALITY OF CELLS, A HEIGHT THRESHOLD PREVIOUSLY DEFINED FOR THAT CELL, RESULTING IN A PLURALITY OF HEIGHT THRESHOLDS ⎯ 292

FOR EACH OF ONE OR MORE ALTITUDES OR ONE OR MORE ALTITUDE TIME SERIES, ESTIMATING A NUMBER OF HANDOVERS OR A FREQUENCY OF HANDOVERS THAT MIGHT BE TRIGGERED FOR THE AERIAL UE DUE TO HEIGHT-BASED HANDOVER EVENTS ALONG THE PLANNED FLIGHT TRAJECTORY, WHEREIN THE ESTIMATING IS BASED ON THE PLURALITY OF HEIGHT THRESHOLDS ⎯ 293

BASED ON THE ESTIMATING, SELECTING A PARTICULAR ALTITUDE FOR THE AERIAL UE FROM THE ONE OR MORE ALTITUDES OR SELECTING A PARTICULAR ALTITUDE TIME SERIES FOR THE AERIAL UE FROM THE ONE OR MORE ALTITUDE TIME SERIES, RESULTING IN A SELECTION ⎯ 294

CAUSING THE AERIAL UE TO CONDUCT A FLIGHT IN ACCORDANCE WITH THE SELECTION ⎯ 295

SYSTEMS AND METHODS FOR DEFINING GEOFENCES VIA HEIGHT THRESHOLD ADJUSTMENTS

FIELD OF THE DISCLOSURE

The subject disclosure relates to defining geofences via height threshold adjustments, customizing height-based measurement report settings for aerial UEs, and/or setting aerial UE altitudes to improve device/network performance.

BACKGROUND

Mobile networks (e.g., long term evolution (LTE), 5G, etc.) offer wide area, high speed, and secure wireless connectivity, which can be leveraged to enhance the control and safety of the operations of aerial user equipment (UEs) (e.g., uncrewed aerial vehicles (UAVs) or drones) and enable beyond visual line-of-sight (LOS) use cases, such as deliveries, communications and media, inspection of critical infrastructure, surveillance, search-and-rescue operations, agriculture, and so on. As technology continues to advance, mobile networks will provide more efficient, tether-less broadband connectivity for wide-scale drone deployments.

BRIEF DESCRIPTION OF THE DRAWINGS

Reference will now be made to the accompanying drawings, which are not necessarily drawn to scale, and wherein:

FIG. 2C is a block diagram illustrating another example, non-limiting embodiment of a system functioning within, or operatively overlaid upon, the communications network of FIG. 1 in accordance with various aspects described herein.

FIG. 2D is a block diagram illustrating yet another example, non-limiting embodiment of a system functioning within, or operatively overlaid upon, the communications network of FIG. 1 in accordance with various aspects described herein.

FIG. 2E depicts an illustrative embodiment of a method in accordance with various aspects described herein.

FIG. 2F depicts an illustrative embodiment of a method in accordance with various aspects described herein.

FIG. 2G depicts an illustrative embodiment of a method in accordance with various aspects described herein.

DETAILED DESCRIPTION

Figure 1:
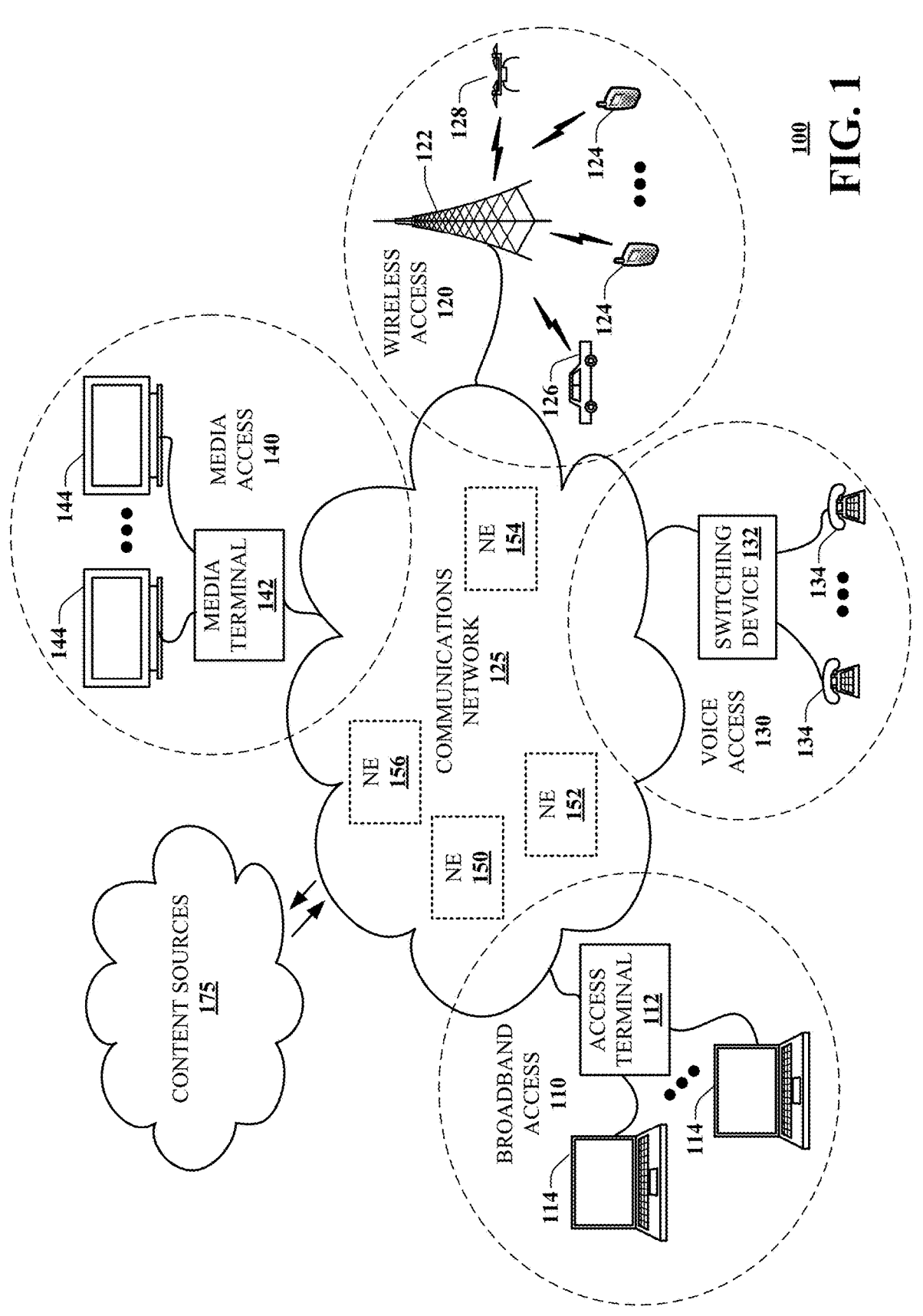
FIG. 1 is a block diagram illustrating an exemplary, non-limiting embodiment of a communications network in accordance with various aspects described herein.

Mobile networks, such as those based on LTE, 5G, etc., are generally designed and optimized for terrestrial broadband communications. For instance, base station (e.g., cNodeB (eNB), gNodeB (gNB), etc.) antennas in these networks tend to be down-tilted so as to reduce the interference power levels of other neighboring cells. Notwithstanding, wireless operators may use terrestrial cellular networks to provide services to aerial UEs. Even with down-tilted base station antennas, for instance, aerial UEs may still be served by sidelobes of the antennas. However, due to the possible presence of nulls in such sidelobes as well as due to the close-to-free-space propagation in the sky, an aerial UE may detect the presence of several base stations. In fact, the higher the aerial UE is, the more cells it can potentially detect. The signal-to-noise ratio (SNR) tends to decrease at higher aerial UE altitudes, and thus an aerial UE may experience signal drops at low SNR points. This is due to the signal strength of the serving cell becoming weaker and interference from neighboring cells getting heavier. In some cases, the aerial UE may even "see" a stronger signal from a base station that is farther away than the one that is geographically closest, and end up being served by that faraway base station rather than by the closest one.

The 3rd Generation Partnership Project (3GPP) has defined a height-based measurement report for aerial UEs. Height-based measurement reports are triggered when an aerial UE reaches a certain height threshold defined for a base station (serving cell). The aerial UE is tasked with monitoring its own altitude and comparing it to the threshold value. As currently defined, height-based measurement reports are sent by the aerial UE to the serving cell in a periodic manner, and generally includes its altitude, the reference signal received power (RSRP) and/or reference signal received quality (RSRQ) associated with the serving cell, and the cell ID and RSRP/RSRQ associated with each detected neighboring cell.

The height threshold of a given cell can be defined based on empirical models that estimate the highest altitude that an aerial UE can reach before experiencing poor SNR. Wireless operators are expected to use the same height threshold for all terrestrial base stations. This is not a requirement, however, and thus different base stations may be defined with different height thresholds. For instance, a base station with an antenna that is tilted down at a sharper angle may warrant a lower height threshold than that of another base station whose antenna is not as tilted.

Certain areas, such as airports, government buildings/sites (e.g., the White House, the United States Capitol Building, etc.), locations at which special events are being held, etc., may be considered off limits for aerial UE operations. It is thus desirable to prevent aerial UEs from traversing near or entering such areas, while assuring safe aerial UE operations. 3GPP does not currently provide standards or recommendations to address this issue. Presently, some wireless operators have opted to create rules and conditions for the network to execute when a height-based event (i.e., an aerial UE reaching a height threshold) is detected. For instance, a wireless operator may force an aerial UE to lower its altitude or execute a handover (HO) of the aerial UE to a neighboring cell that can support the aerial UE's altitude. If no detected target cell can support the aerial UE's current altitude, the trajectory of the aerial UE may then need to be changed so that it can find a suitable target cell.

The subject disclosure describes, among other things, illustrative embodiments of a height-based management platform that is capable of defining one or more geofences for a designated area, such as a certain restricted area, by adjusting height thresholds of network nodes (base stations or cells) that are in the vicinity (e.g., within threshold distance(s) from one or more points) of the designated area. In exemplary embodiments, the adjustments may involve decreasing a given height threshold to a value that is less than a minimum supported altitude for aerial UE(s). In various embodiments, the resulting height threshold may be less than a default height threshold for the network node, which may have been previously defined by a wireless operator or a wireless network standard. Adjusting the height thresholds of cells that are in the vicinity of a designated area may facilitate blacklisting of those cells as handover targets, which can limit the ability of aerial UEs to connect to those cells. This serves as a mandate to aerial UEs to seek for (or be handed over to) cells that are outside of or that are sufficiently far away from the designated area, thereby preventing them from traversing near or entering the area, all without affecting the safety of their aerial operations.

In exemplary embodiments, the height-based management platform may additionally, or alternatively, be capable of customizing height-based measurement report settings for aerial UEs based on individual aerial UE capabilities and/or quality-of-service (QoS) requirements (e.g., relating to latency, transmission speed, transmission frequency, etc.), network conditions, and/or the like. In various embodiments, the height-based management platform may identify different height threshold presets that a base station (cell) can provide to a given aerial UE for purposes of triggering height-based events. For instance, in some embodiments, the height-based management platform may identify a conservative height threshold that has a low value and an aggressive height threshold that has a high value, where these height thresholds may correspond to (or be deemed suitable for) different aerial UE capabilities, traffic requirements, etc. This can advantageously influence or affect a frequency or likelihood of height-based trigger events depending on the aerial UE's operations, which can improve the quality of service delivery for aerial UEs, reduce aerial UE battery power consumption, and/or reduce network signaling overhead as desired.

Because different base stations (cells) may have their own operating characteristics (e.g., relating to power gain, frequency bands, elevation angle, azimuth angle, morphology (rural vs. urban), etc.), height thresholds may be different for different base stations. An aerial UE may be handed over to another cell if its current altitude is greater than the serving cell's height threshold. It would be preferable to hand the aerial UE over to a target or new serving cell that has a larger height threshold (rather than to one that has a smaller height threshold) so as to avoid an (immediate) subsequent handover of the aerial UE again by the new serving cell. In the case of an autonomous aerial UE, a ground station or command center may generate a flight plan for the aerial UE from a departure location to a destination, including certain altitude(s) for the aerial UE to fly at during the flight. Over the course of a flight, an aerial UE may be subjected to multiple/consecutive HO events by virtue of its traversal through areas covered by various base stations with different height thresholds. Setting incorrect or inappropriate altitudes for the aerial UE may result in frequent and/or a large number of HO events, which can drain aerial UE battery power, negatively impact the aerial UE's flight, as well as lead to increased network signaling overhead. As an example, setting an incorrect or inappropriate altitude for the aerial UE can cause the aerial UE to constantly change its altitude to comply with a current serving cell's height threshold. Setting an altitude that is too high may cause the aerial UE to keep reselecting target cells, which drain battery power. Preserving aerial UE battery power is crucial to assure that the aerial UE is able to reach its destination and perhaps make a successful return. As another example, setting an altitude that is too low may impact the aerial UE's journey, as the aerial UE may come across more obstacles if it flies at a lower altitude.

In exemplary embodiments, the height-based management platform may additionally, or alternatively, be capable of setting or selecting one or more altitudes for an aerial UE's flight that are determined to result in a reduced number of (or less frequent) handovers driven by height-based events. The number or frequency of handovers may be reduced as compared to a scenario where the aerial UE's altitude(s) during the flight are selected by a ground station or command center without the aid of the height-based management platform. In exemplary embodiments, the height-based management platform may, as described in more detail below, be configured to identify a constant altitude or an altitude time series for a given aerial UE based on empirical mathematical models and/or prior observations or test data.

One or more aspects of the subject disclosure include a device, comprising a processing system including a processor, and a memory that stores executable instructions that, when executed by the processing system, facilitate performance of operations. The operations can include identifying a first plurality of cells that are located within a first threshold distance from one or more locations in a designated area. Further, the operations can include, for each cell of the first plurality of cells, defining a respective height threshold that is less than a determined minimum supported aerial user equipment (UE) altitude. Further, the operations can include, based on detecting that an aerial UE has transmitted, to a serving cell, a height-based measurement report that includes information regarding neighboring cells of the serving cell, obtaining data regarding height thresholds associated with the neighboring cells, wherein one or more of the neighboring cells is included in the first plurality of cells. Further, the operations can include determining that each of the one or more of the neighboring cells has a height threshold that is less than the determined minimum supported aerial UE altitude. Further, the operations can include performing an action to prevent each of the one or more of the neighboring cells from being a handover target cell for the aerial UE, thereby facilitating adjustment of a flight trajectory of the aerial UE such that the aerial UE avoids approaching the designated area.

One or more aspects of the subject disclosure include a non-transitory machine-readable medium, comprising executable instructions that, when executed by a processing system of an aerial user equipment (UE) including a processor, facilitate performance of operations. The operations can include receiving a height-based measurement report setting from a serving cell, wherein the height-based measurement report setting includes a height threshold for the serving cell. Further, the operations can include monitoring an altitude of the aerial UE during flight of the aerial UE. Further, the operations can include, responsive to the monitoring, determining that the altitude of the aerial UE is greater than or equal to the height threshold. Further, the operations can include, based on the determining, transmitting a height-based measurement report to the serving cell, wherein the height-based measurement report identifies detected neighboring cells, thereby enabling a height-based management platform to obtain data regarding height thresholds associated with the detected neighboring cells and prevent any cell of the detected neighboring cells whose height threshold is less than a determined minimum supported aerial UE altitude from being a handover target for the aerial UE. Further, the operations can include, after the transmitting, adjusting a flight trajectory of the aerial UE based on prevention of one or more of the detected neighboring cells from being handover targets for the aerial UE.

One or more aspects of the subject disclosure include a method. The method can comprise identifying, by a processing system including a processor, a network node that is located within a threshold distance from one or more locations in a restricted area. Further, the method can include defining, by the processing system, a height threshold for the network node that is less than a determined minimum supported aerial user equipment (UE) altitude. Further, the method can include detecting, by the processing system, that an aerial UE has experienced a height-based trigger event in relation to a serving cell of the aerial UE. Further, the method can include, based on the detecting, identifying, by the processing system, a neighboring network node of the serving cell and determining that the neighboring network node of the serving cell is the network node that is located within the threshold distance from the one or more locations in the restricted area. Further, the method can include, based on the determining, blacklisting, by the processing system, the neighboring network node from being a candidate handover target for the aerial UE.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, defining of geofences via height threshold adjustments, customizing of height-based measurement report settings for aerial UEs, and/or setting of aerial UE altitudes to improve device/network performance. In particular, a communications network 125 is presented for providing broadband access 110 to a plurality of data terminals 114 via access terminal 112, wireless access 120 to a plurality of mobile devices 124, vehicle 126, and aerial UE 128 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
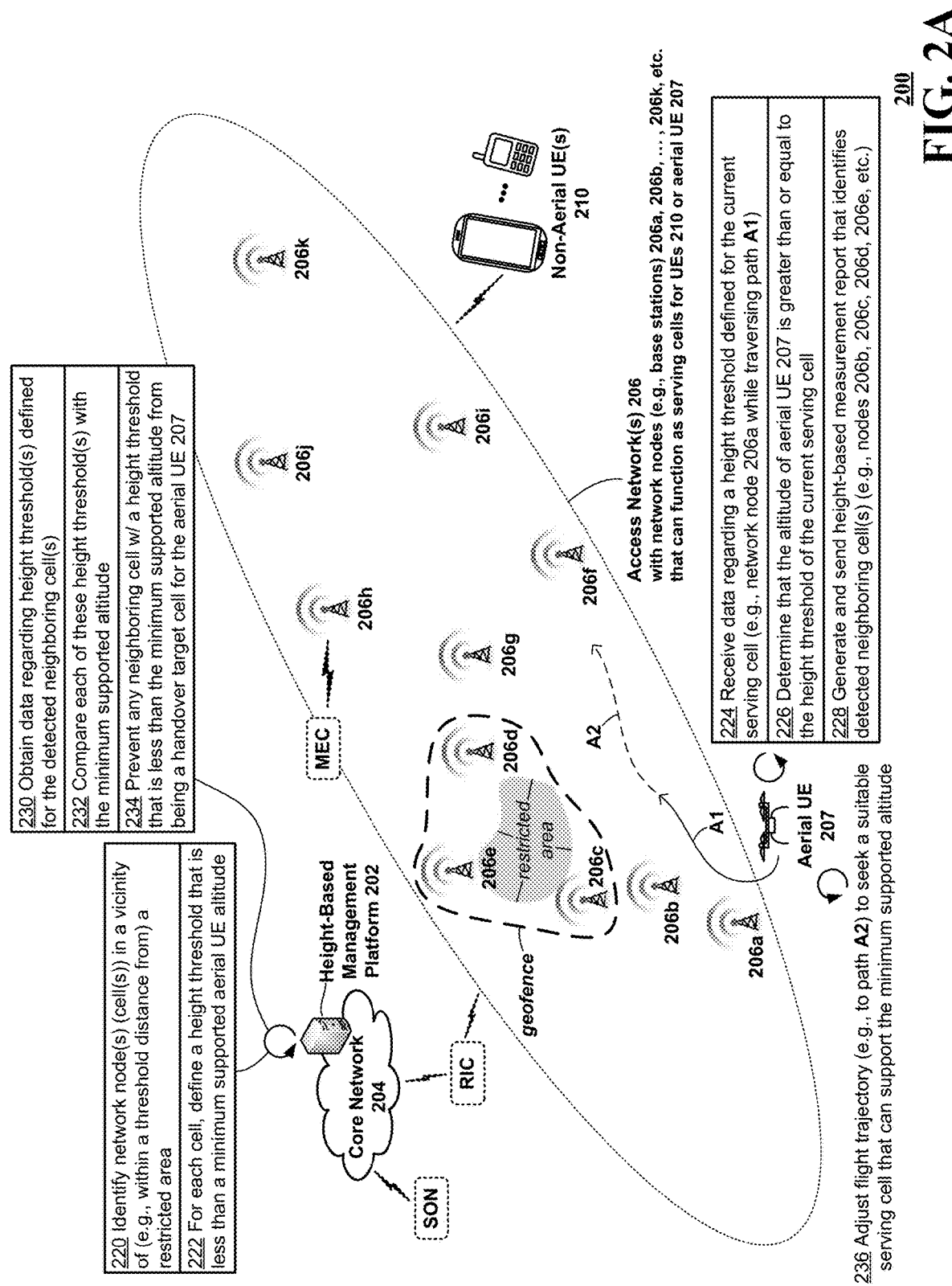
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a network system 200 functioning within, or operatively overlaid upon, the communications network 100 of FIG. 1 in accordance with various aspects described herein. As shown in FIG. 2A, the network system 200 may include a core network 204, one or more access networks 206, one or more aerial UEs 207 (i.e., uncrewed aerial vehicle(s) (UAVs)/drone(s)), and one or more non-aerial UEs 210.

The core network 204 may include network devices and/or systems that provide a variety of functions. In certain embodiments, the core network 204 may be implemented in a cloud architecture. Examples of functions provided by, or included, in the core network 204 include an access mobility function (AMF) configured to facilitate mobility management in a control plane of the network system 200 (including, for instance, providing UE mobility information associated with the access network(s) 206 and/or the aerial UEs 207 to the core network 204), a user plane function (UPF) configured to provide access to a data network, such as a packet data network (PDN), in a user (or data) plane of the network system 200, a Unified Data Management (UDM) function, a Session Management Function (SMF), a policy control function (PCF), and/or the like. The core network 204 may be in communication with one or more other networks (e.g., one or more content delivery networks (CDNs)), one or more services, and/or one or more devices. In one or more embodiments, the core network 204 may include one or more devices implementing other functions, such as a master user database server device for network access management, a PDN gateway server device for facilitating access to a PDN, and/or the like. The core network 204 may include various physical/virtual resources, including server devices, virtual environments, databases, and so on.

In various embodiments, an access network 206 may include a wireless radio access network (RAN), a Wi-Fi network, and/or a wireline network. In exemplary embodiments, the access network 206 may be implemented in open source software (e.g., in an OpenAirInterface (OAI) wireless technology platform). The access network 206 may include network resources, such as one or more physical access resources and/or one or more virtual access resources. Physical access resources can include base station(s) (e.g., one or more eNodeBs, one or more gNodeBs, or the like, such as base stations 206*a*, 206*b*, . . . 206*k*, etc.), one or more satellites, one or more Gigabyte Passive Optical Networks (GPONs) or related components (e.g., Optical Line Terminal(s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the access network 206. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 206 may include any number/types of physical/virtual access resources and various types of heterogeneous cell configurations with various quantities of cells and/or types of cells.

In certain embodiments, the access network 206 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the access network 206 may include, or communicate with, a RAN intelligent controller (RIC).

The system 200 can provide services to various types of devices—e.g., aerial UEs 207 and other (e.g., non-aerial) UEs 210. Examples of UEs 210 include mobile devices 124, display and television devices, home and business networks, IoT devices, video and audio devices, and so on. A UE 210 may be equipped with one or more transmitter (Tx) devices and/or one or more receiver (Rx) devices configured to communicate with, and utilize network resources of, the system 200.

An aerial UE 207 may include any (e.g., manually controllable or autonomous) personal or commercial aerial vehicle or device that is equipped with one or more types of devices or components for performing various actions. In certain embodiments, an aerial UE 207 may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of the aerial UE 207, one or more mechanical limbs for physically manipulating external objects, and/or the like.

In some embodiments, one or more aerial UEs 207 may be deployed to provide network connectivity for the UE(s) 210. In certain embodiments, an aerial UE 207 may provide network connectivity by way of wireless "tethering" to (e.g., a base station or the like of) the access network 206 or a different access network (i.e., one that is not experiencing a traffic surge condition) and/or via a wired link (e.g., over a fiber connection) to a network device (e.g., edge computing device or the like) that has a backhaul connection to the core network 204. An aerial UE 207 may additionally, or alternatively, communicate data (e.g., control data, user data, etc.) via the wireless tethering or wired link.

As shown in FIG. 2A, the network system 200 may also include a height-based management platform 202. In various embodiments, the height-based management platform 202 may be implemented in one or more devices included in the core network 204. For example, in a case where the core network 204 includes an evolved packet core (EPC), the height-based management platform 202 may include, or may be implemented in, a mobility management entity (MME) gateway, a serving gateway (SGW), or another EPC system or device. As another example, in a case where the core network 204 includes a 5G core (5GC), the height-based management platform 202 may include, or may be implemented in, an AMF or another 5GC system or device.

In various embodiments, the height-based management platform 202 may be implemented in a centralized network hub or node device at, or proximate to, an edge of a network provider's overall network. In some embodiments, the height-based management platform 202 can be implemented in a MEC device or devices. As the name/nomenclature implies, a MEC device may reside at a location that is at, or proximate, to an edge of the network system 200, which may be useful in reducing (e.g., minimizing) delays associated with provisioning of data or services to one or more (requesting) devices. In some embodiments, the height-based management platform 202 may additionally, or alternatively, be implemented in a Self-Organizing Network (SON) or other similar network that provides automatic planning functions, configuration functions, optimization functions, diagnostic functions, and/or healing functions for a network. In some embodiments, the height-based management platform 202 may additionally, or alternatively, be implemented in a RIC or other similar device or device(s) that leverage data analytics and machine learning and/or artificial intelligence to provide resource management capabilities, such as mobility management, admission control, and interference management, at an edge of a network.

In exemplary embodiments, the height-based management platform 202 may execute one or more algorithms that are configured to define one or more geofences for one or more designated areas, such as certain restricted areas, by adjusting height thresholds of network nodes (base stations or cells) that are in the vicinity of (e.g., within threshold distance(s) from one or more locations in) the designated areas. A designated area may be a permanent restricted area or may only be temporally restricted. For instance, an airport, a government building (e.g., the White House, the United States Capitol Building, etc.), and/or the like may be a permanent restricted area, whereas a public park at which a concert or other event is being held may only be a temporally restricted area.

As shown by reference number 220, the height-based management platform 202 may identify (e.g., all) network nodes (cells) that are in a vicinity of (e.g., within a threshold distance from one or more points or locations in) a restricted area. As an example, in a case where the core network 204 includes an EPC, the height-based management platform 202 may identify eNBs that are within a threshold distance from one or more location points in the restricted area. As another example, in a case where the core network 204 includes a 5GC, the height-based management platform 202 may identify gNBs that are within a threshold distance from one or more location points in the restricted area. The threshold distance may be any suitable value (e.g., ten meters, fifty meters, etc.), and may be determined based on empirical studies. In some embodiments, the height-based management platform 202 may identify (e.g., automatically or based on manual input) data regarding the restricted area (e.g., global positioning system (GPS) coordinates associated with a geographic perimeter of the restricted area, a determined center point of the restricted area, etc.), and may compare that data with other data regarding the locations (e.g., GPS coordinates) of one of more network nodes of the access network 206 to identify network node(s) that are within the threshold distance. Here, for instance, the height-based management platform 202 may identify cells 206c, 206d, and 206e as being within the threshold distance.

As shown by reference number 222, the height-based management platform 202 may define, for each identified cell, a height threshold that is less than a minimum supported aerial UE altitude. In one or more embodiments, the minimum supported altitude may be associated with the aerial UE 207. In certain embodiments, the height-based management platform 202 (and/or one or more systems or devices of the core network 204) may determine the minimum supported altitude based on flight plan or flight trajectory/status information associated with the aerial UE 207. For instance, a ground station, which provides command and control navigation instructions to (or that plans an autonomous flight for) the aerial UE 207, may be communicatively coupled to the height-based management platform 202 (and/or one or more systems or devices of the core network 204) and may provide the flight plan or flight trajectory/status thereto that specifies the lowest altitude at which the aerial UE 207 can assume or fly. In some embodiments, a manufacturer of the aerial UE 207 may specify—e.g., in specification data loaded into memory of the aerial UE 207 or the ground station or in an accessible central database—a minimum supported or recommended altitude for the aerial UE 207.

In various embodiments, the height-based management platform 202 (and/or one or more systems or devices of the core network 204) may additionally, or alternatively, determine the minimum supported altitude based on information associated with the identified cell(s). For instance, the height-based management platform 202 (and/or one or more systems or devices of the core network 204) may obtain data regarding an environment/surroundings of identified base stations, such as the heights of buildings or structures located within a threshold distance from the identified base stations, weather data, and/or the like, to identify a "safe" altitude for an aerial UE to operate at, and may utilize that safe altitude value as the minimum supported altitude.

By basing one or more height thresholds of one or more of the identified cells on the minimum supported altitude (such as by setting each of the height thresholds to a value that is less than the minimum supported altitude), a suitable artificial geofence can be created to restrict or otherwise discourage the aerial UE 207 from traversing too close to or entering into the restricted area.

In exemplary embodiments, the height-based management platform 202 may have access to or otherwise manage a data structure (e.g., database, table, and/or the like) that stores default/adjusted height thresholds for one or more cells (e.g., each cell) in the access network 206. The data structure may include an entry for each cell that identifies the cell's ID, the height threshold (prior-defined and/or adjusted), the location of the cell, or a combination of some or all of this information. In some embodiments, the data structure may be located in one or more network management elements (e.g., mobility management entities and/or the like) associated with the cells.

In various embodiments, the defined (or adjusted) height threshold(s) for the identified cell(s) may also be less than default (or normal) height threshold(s) associated with those cells. The default height threshold for a given network node may be previously defined and set by a wireless operator or according to a wireless network standard. In one or more embodiments, the default height threshold for a given network node may be set based on data obtained from prior signal-related tests, mathematical models, and/or observations. In some cases, the default height threshold may be the same for all network nodes of the access network 206. More realistically, however, the default height threshold may be different for some or all of the network nodes. For instance, different network node antennas may be tilted at different angles, and so a network node with an antenna that is tilted down at a sharper angle may warrant a lower default height threshold than that of another network node whose antenna is not as tilted. In any case, here, where the default height threshold for cell 206c is 50 feet, the default height threshold for cell 206d is 70 feet, and the default height threshold for cell 206e is 100 feet, for instance, their height thresholds may be respectively adjusted (i.e., lowered) to other values, such as, for example, 10 feet, 15 feet, and 12 feet.

As shown by reference number 224, the aerial UE 207 may receive data regarding a height threshold defined for the current serving cell—e.g., network node 206a. The aerial UE 207 may receive the data regarding the height threshold either prior to, during, or shortly after attaching to the cell 206a during its flight along a path A1. In exemplary embodiments, the data may include height-based measurement report settings that specify the height threshold of the serving cell. The settings may additionally include one or more other items of information, such as a required periodicity of reporting (e.g., where the aerial UE 207 is to provide a measurement report every sixty seconds regardless of its altitude reaching/exceeding the height threshold).

As shown by reference number 226, the aerial UE 207 may determine that its altitude is greater than or equal to the height threshold of the current serving cell, thus triggering a height-based event. In exemplary embodiments, the aerial UE 207 may (e.g., constantly or periodically) monitor its altitude and compare it against that height threshold to determine whether a height-based event is triggered.

As shown by reference number 228, the aerial UE 207 may generate and send a height-based measurement report that identifies detected neighboring cells (e.g., network nodes 206b, 206c, 206d, 206c, etc.). In various embodiments, the height-based measurement report may include cell IDs of the detected neighboring cells and signal power/quality information associated with those cells. In certain embodiments, cells may be configured to broadcast their respective height thresholds. In these embodiments, the height-based measurement report may also include the height thresholds associated with the neighboring cells.

As shown by reference number 230, the height-based management platform 202 may obtain data regarding height threshold(s) defined for the detected neighboring cell(s). In various embodiments, the height-based management platform 202 may obtain, from the serving cell (e.g., here, cell 206a), a portion or an entirety of the height-based measurement report. The serving cell may automatically relay the portion or the entirety of the report to the height-based management platform 202. Alternatively, the serving cell may provide an indication to the height-based management platform 202 that it received the height-based measurement report, after which the height-based management platform 202 may request the serving cell to transmit the portion or the entirety of the report. In a case where the height-based management platform 202 manages the above-described data structure of network node height thresholds, the height-based management platform 202 may query the data structure with the detected neighboring cells' IDs to identify their corresponding height thresholds. In a different case where the height thresholds of detected neighboring cells are included in the height-based measurement report, the height-based management platform 202 may obtain the height thresholds from the report.

As shown by reference number 232, the height-based management platform 202 may compare each height threshold with the above-described minimum supported altitude, and as shown by reference number 234, the height-based management platform 202 may prevent any neighboring cell with a height threshold that is less than the minimum supported altitude from being a handover target or candidate cell for the aerial UE 207. In some embodiments, the height-based management platform 202 may blacklist any such cell from being a handover target for the aerial UE 207 such that the serving cell is restricted from facilitating a handover of the aerial UE 207 to that cell. As an example, in a case where the height-based management platform 202 determines that each of the height thresholds of cells 206c. 206d, and 206e (which, as discussed above with respect to reference number 222, has been adjusted to a lower value) is less than the minimum supported altitude, the height-based management platform 202 may blacklist these cells 206c. 206d, and 206e from being target cells for the aerial UE 207.

Figure 2B:
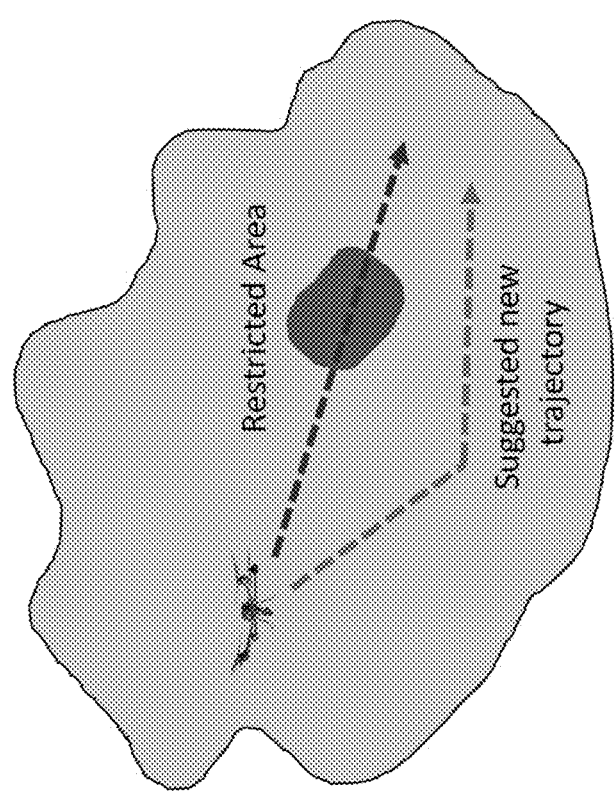
FIG. 2B illustrates an example adjustment to an aerial UE's flight trajectory in accordance with various aspects described herein.

As shown by reference number 236, the aerial UE 207 may then adjust its flight trajectory (e.g., to path A2) in order to seek a suitable serving cell that can support the minimum supported altitude. In exemplary embodiments, the height-based management platform 202 may, by virtue of performing step 234 above, cause the aerial UE 207 to seek a suitable target cell (i.e., other than those that have been blacklisted) when a height-based event is triggered for its current serving cell. For instance, in a case where all of the cells along the aerial UE 207's current trajectory have been blacklisted, its trajectory may need to be changed so that the aerial UE 207 can find and attach to a target cell with a height threshold that can support the minimum supported altitude. As part of the trajectory adjustment, the aerial UE 207 may decrease (or increase) its altitude and/or traverse in a particular direction away from the blacklisted cells (and thus away from the restricted area). In certain embodiments, the height-based management platform 202 may identify suggested adjustment(s) to the altitude and/or trajectory of the aerial UE 207 (e.g., FIG. 2B), and may cause data regarding the suggested adjustment(s) to be provided to the aerial UE 207 and/or its associated ground station for consideration and use. It is to be understood and appreciated that the adjusted flight trajectory may be effected autonomously by the aerial UE 207 and/or manually via the ground station. In the case of autonomous flight, the aerial UE 207 may, as a result of certain cells being blacklisted as described above, determine that there is a lack of coverage (a "hole" in coverage) in its current trajectory, and may automatically adjust its altitude and/or flight trajectory to seek coverage elsewhere. Alternatively, in the case of manual control of the aerial UE 207, visual identification of the lack of coverage may prompt the ground station (e.g., a pilot) to similarly adjust the altitude and/or flight trajectory to seek coverage elsewhere.

In one or more embodiments, the height-based management platform 202 may define multiple geofences about a designated area. For instance, although FIG. 2A only shows a single defined geofence, there may be additional geofences that have smaller or larger perimeters than that of the geofence shown. In various embodiments, the height thresholds of cells associated with a smaller geofence may be smaller than the height thresholds of cells associated with a larger geofence. Defining multiple geofences in this way provides a set of "rings" or "fences" that progressively inflict greater and greater restrictions to aerial UE flight the closer an aerial UE is to the restricted area.

In various embodiments, in a case where the designated area is only a temporally restricted area, the height-based management platform 202 may initiate a timer according to the duration at which the designated area is to be deemed restricted, and may, upon expiration of the timer, re-adjust the height thresholds of one or more of the cells back to their default values.

In certain embodiments, one or more of the aforementioned steps of FIG. 2A may be performed (e.g., only) in relation to those cells that are determined to be capable of supporting aerial UEs—e.g., that are capable of providing network coverage to aerial UEs.

In exemplary embodiments, the height-based management platform 202 may additionally, or alternatively, execute one or more algorithms that are configured to customize height-based measurement report settings for aerial UEs based on individual aerial UE capabilities and/or quality-of-service (QOS) requirements, network conditions, and/or the like. As such, the height-based measurement report settings may or may not be the same (i.e., may vary) for different network nodes/aerial UEs. Referring to FIG. 2C, as shown by reference number 242, the height-based management platform 202 may obtain information regarding an aerial UE 207. For instance, the height-based management platform 202 may detect that the aerial UE 207 has attached to the network node 206a (e.g., based on communications from the network node 206*a*), and may (e.g., request and) receive the information from the aerial UE 207 and/or the network node 206*a*. In exemplary embodiments, the information may identify traffic type(s)/requirement(s) associated with the aerial UE 207. For instance, the aerial UE 207 may be utilizing the network for navigational purposes as part of routing from one location to another. As another example, the aerial UE 207 may be utilizing the network to transfer collected data (e.g., sensor data, video data, etc.) to a ground-based system at a particular minimum throughput. As yet another example, the aerial UE 207 may be undergoing constant back-and-forth communications with a ground-based system that cannot exceed a certain latency. In some embodiments, the information may additionally, or alternatively, identify capabilities of the aerial UE 207 (e.g., maneuverability capabilities of the aerial UE 207, such as its ability to increase or decrease its altitude at faster than a threshold rate), the aerial UE's remaining battery power level, the aerial UE 207's flight characteristics/trajectory, and/or other aerial UE-related characteristics or parameters. In one or more embodiments, the height-based management platform 202 may instruct the network node to obtain the information and relay the information to the height-based management platform 202. Alternatively, the aerial UE 207 may automatically provide the information during or after attachment to the network node.

As shown by reference number 244, the height-based management platform 202 may obtain data associated with the network node that correlates altitude values with signal quality levels and/or probabilities of connectivity disruption (e.g., call drop, radio link failure, etc.). In various embodiments, the height-based management platform 202 (and/or one or more systems or devices of the core network 204) may, for each given network node that is capable of supporting aerial UEs, identify and/or store multiple altitude values (e.g., a range of altitude values usable as possible height thresholds) that can be selectively included in that network node's height-based measurement report settings. In one or more embodiments, the height-based management platform 202 (and/or one or more systems or devices of the core network 204) may store the altitude values in one or more data structures (e.g., database(s), table(s), etc.) along with corresponding information regarding signal-to-noise (SNR) levels, probabilities of service disruption, and/or the like. An example table for a given network node is shown by reference number 242*t* in FIG. 2C. It is to be understood and appreciated that altitude values and/or the corresponding information may vary for different network nodes. This is due to a variety of factors, such as differences in network node type, differences in network node capabilities, differences in antenna tilt angles, etc.

In exemplary embodiments, the altitude values and their corresponding information may be obtained or determined via observations/measurements and/or empirical mathematical models. For instance, tests relating to network nodes (cells) may be conducted to ascertain their operational capabilities and limits for different altitudes. As another example, measurements relating to communications between network nodes (cells) and aerial UE(s) during actual flights may be obtained. In any case, some or all of these observations/measurements may be used to identify the altitude values and their corresponding information for a given network node. In various embodiments, some or all of the observations/measurements may be used to form one or more empirical models (which may be updated based on new or periodic observations/measurements) that inform on the probabilities of certain service-related outcomes for different altitudes.

As shown by reference number 246, the height-based management platform 202 may determine a conservative height threshold and an aggressive height threshold for the network node. In various embodiments, the height-based management platform 202 may determine the conservative height threshold and the aggressive height threshold for based on an analysis of the aforementioned altitude values and corresponding information for the network node. For example, the height-based management platform 202 may select an altitude value that is correlated with a SNR that is greater than a threshold SNR and/or that is correlated with a connectivity disruption probability (e.g., call drop probability) that is less than a threshold probability, as the conservative height threshold. Continuing the example, the height-based management platform 202 may then choose a higher altitude value as the aggressive height threshold. As another example, the height-based management platform 202 may select an altitude value that is correlated with a SNR that is less than a threshold SNR and/or that is correlated with a connectivity disruption probability (e.g., call drop probability) that is greater than a threshold probability, as the aggressive height threshold. Continuing this example, the height-based management platform 202 may then choose a lower altitude value as the conservative height threshold.

In one or more embodiments, the height-based management platform 202 may perform the conservative and/or aggressive height threshold determinations using one or more mathematical models and/or prior service-related observation data. In certain embodiments, the height-based management platform 202 may determine a conservative height threshold that has a low value and an aggressive height threshold that has a high value, where these height thresholds may correspond to (or be deemed suitable for) different aerial UE capabilities, traffic requirements, etc. For instance, in a case where the network node 206*a*'s data is reflected in table 242*t*, the height-based management platform 202 may select 50 feet as the conservative height threshold and/or select 60 feet as the aggressive height threshold. A conservative height threshold (i.e., a lower height threshold) may be recommended for (or may be more be suitable in) situations where an aerial UE is utilizing the (e.g., LTE, 5G, etc.) network to send/receive command and control messaging for purposes of navigation or flight control. This is because a lower height threshold will likely trigger more often than a higher height threshold, which can permit the aerial UE to better maintain its connection to the overall network for its navigational control (even if more handovers may be required to do so). In some cases, a conservative height threshold may additionally, or alternatively, be recommended for (or may be more be suitable in) situations where an aerial UE is known or determined to be capable of moving upwards quickly (i.e., increasing its altitude at faster than a threshold rate) and/or where an aerial UE's remaining battery power level satisfies (e.g., is greater than or equal to) a threshold power level. On the other hand, an aggressive height threshold (i.e., a higher height threshold) may be recommended for (or may be more suitable in) situations where an aerial UE is utilizing the (e.g., LTE, 5G, etc.) network to relay video data to a ground-based system. This is because a higher height threshold will likely trigger less often than a lower height threshold, and thus fewer handover-related signaling events may be needed, which can conserve the aerial UE's battery power for its data relaying operations. In some cases, an aggressive height threshold may additionally, or alternatively, be recommended for (or may be more be suitable in) situations where an aerial UE is known or determined to be capable of dropping its altitude quickly (i.e., decreasing its altitude at faster than a threshold rate) and/or where an aerial UE's remaining battery power level does not satisfy (e.g., is less than) a threshold power level.

It is to be understood and appreciated that the height-based management platform 202 may not necessarily utilize the exact altitude values in the data structure(s), but may select altitude values that are slightly different than those in the data structure(s). For instance, in the above-described example that references table 242*t*, instead of choosing 50 feet as the conservative threshold, the height-based management platform 202 may instead select 51 feet or 52 feet or any other value that is within a threshold difference from 50 feet.

As shown by reference number 248, the height-based management platform 202 may select height-based measurement report setting(s)—e.g., including the conservative height threshold or the aggressive height threshold—for that network node based on an analysis of the information regarding the aerial UE 207. As shown by reference number 250, the height-based management platform 202 may cause the network node to provide the height-based measurement report setting(s) to the aerial UE 207. The aerial UE 207 can then monitor its altitude against the specified height threshold during its flight for height-based measurement reporting.

One or more considerations, such as available aerial UE battery power level, aerial UE capability to adjust its altitude and/or trajectory, current aerial UE operations, and so on, may be factored into the choice (248) of the conservative height threshold or the aggressive height threshold. An aerial UE may run different applications with different QoS requirements and varying levels of susceptibility to service/call drops, and thus, in some embodiments, selection of either the conservative or the aggressive height threshold may be made with the goal of reducing the chances of service drop as needed or appropriate. Use of a conservative height threshold can better prevent a service drop since the network will have more time to mandate/effect handover of the aerial UE to another cell or to request the aerial UE to lower its altitude. The tradeoffs for using a conservative height threshold are increased signaling overhead and higher aerial UE battery power consumption. Conversely, use of an aggressive height threshold can reduce signaling overhead, under the assumption that the network can more quickly influence aerial UE trajectory changes and/or mandate/effect handover of the aerial UE to another cell.

Mandating a network node to use one height threshold or another such that the network node sends customized height-based measurement report settings to each aerial UE based on that aerial UE's operations can influence or affect a frequency or likelihood of height-based trigger events for that aerial UE. This allows for improved quality of service delivery for the aerial UE, reduced aerial UE battery power consumption, and/or reduced network signaling overhead, as desired. For instance, in a case where the aerial UE 207 has a remaining battery power level that is less than a threshold value, an aggressive height threshold can be used for the aerial UE 207, which can reduce the frequency or likelihood of a height-based trigger event and thus reduce battery power consumption that might otherwise be needed for transmitting height-based measurement reports and/or engaging in handovers from one cell to another. As another example, in a case where the aerial UE 207 is engaging in command-and-control navigation messaging with a ground station, and requires continued connectivity to the network with signaling that is above a threshold SNR value, a conservative height threshold can be used for the aerial UE 207, which can improve the overall quality of service delivery for the aerial UE and thus maintain navigability of the aerial UE 207.

In certain embodiments, the height-based management platform 202 may modify its selection of the height threshold either periodically or if one or more conditions are satisfied. For instance, in a case where the conservative height threshold was previously selected for the network node 206*a*, and where the height-based management platform 202 determines (e.g., based on updates received from the aerial UE 207 and/or the network node 206*a*) that the aerial UE 207's battery power level has fallen below a threshold power level, the height-based management platform 202 may update the height-based measurement report setting(s) for the network node 206*a* with the aggressive height threshold and cause the network node 206*a* to provide the adjusted setting(s) to the aerial UE 207. As another example, in a case where the aggressive height threshold was previously selected for the network node 206*a* due to a determination that the aerial UE 207 is conducting high-volume data transmissions to a ground receiver, and where the height-based management platform 202 determines (e.g., based on updates received from the aerial UE 207 and/or the network node 206*a*) that the aerial UE 207 is no longer conducting such transmissions, the height-based management platform 202 may update the height-based measurement report setting(s) for the network node 206*a* with the conservative height threshold and cause the network node 206*a* to provide the adjusted setting(s) to the aerial UE 207. In this way, the height-based management platform 202 may essentially change the periodicity or frequency of height-based trigger events for a given network node and aerial UE pair "on the fly," as needed.

Although two height thresholds—i.e., conservative and aggressive ones—are discussed above, it is to be understood and appreciated that the height-based management platform 202 may additionally identify one or more other thresholds, and may select one or more thresholds from the set of identified thresholds for use by a network node.

It is to be understood and appreciated that a network node may be configured to perform one or more of the above-described steps of FIG. 2C. As an example, the network node 206*a* may be configured to select/adjust a height threshold to use for aerial UE 207. The network node may perform any of the steps with or without coordination with the height-based management platform 202. For instance, in certain embodiments, the height-based management platform 202 may determine both the conservative and aggressive height threshold for the network node, but the network node may determine which of the conservative or the aggressive height threshold to utilize for a given aerial UE.

In certain embodiments, one or more of the aforementioned steps of FIG. 2C may be performed (e.g., only) in relation to those cells that are determined to be capable of supporting aerial UEs—e.g., that are capable of providing network coverage to aerial UEs.

In exemplary embodiments, the height-based management platform 202 may additionally, or alternatively, execute one or more algorithms that are configured to set or select one or more altitudes for an aerial UE's flight that are determined to result in a reduced number of (or less frequent) height-based handover events. Referring to FIG. 2D, as shown by reference number 262, the height-based management platform 202 may identify network node(s) (cell(s)) in a vicinity of (e.g., within a threshold distance from) a determined flight trajectory of an aerial UE 207. As an example, the aerial UE 207 may have a planned travel route (B) where network coverage is available via various network nodes. The flight trajectory of the aerial UE 207 may be predetermined by a ground station, beginning from a departure location to a destination location. In some cases, the aerial UE 207 may follow the preplanned flight trajectory in an autonomous or semi-autonomous way (e.g., where manual adjustments can be made via instructions from the ground station and/or other system, such as a network node, the height-based management platform 202, etc.). Here, the height-based management platform 202 may identify network node(s) (cell(s)) that are located within a threshold distance from one or more points of a determined flight trajectory of the aerial UE 207.

As shown by reference number 264, the height-based management platform 202 may, for each identified cell, identify a height threshold that has been defined for that cell. For example, in a case where the height-based management platform 202 has access to or otherwise manages a data structure that stores height thresholds for one or more cells in the access network 206 (e.g., as described above with respect to FIG. 2A), the height-based management platform 202 may perform a lookup operation to ascertain the height threshold of each of the identified cells. As another example, the height-based management platform 202 may query each of the identified cells to respond with data regarding their respective height thresholds.

As shown by reference number 266, the height-based management platform 202 may, for each of one or more altitudes and/or one or more altitude time series, estimate/predict a number of and/or a frequency of handovers that might be triggered for the aerial UE 207 due to height-based handover events along its flight trajectory. For a given constant aerial UE altitude, the aerial UE may experience a number of handovers that are driven by height-based trigger/handover events. An altitude time series refers to a sequence of altitudes values—i.e., a set of altitudes that the aerial UE may assume (or fly at) during the trajectory over time. See reference number 266e for a graphical representation of an example altitude time series. In exemplary embodiments, the height-based management platform 202 may run one or more heuristic models to facilitate the estimation. The height-based management platform 202 may identify one or more constant altitudes (e.g., 50 feet, 80 feet, 200 feet, etc.), and may run the model(s) on each of these constant altitudes to estimate the number of and/or the frequency of handovers that might be triggered for the aerial UE 207 for a portion or an entirety of the duration of its flight. Additionally, or alternatively, the height-based management platform 202 may identify one or more altitude time series (e.g., a sequence of altitudes that includes 50 feet for the first ten minutes of the flight or for the first eighty meters of the flight, 95 feet for the next six minutes of the flight or for the next fifty-five meters of the flight, and so on; a different sequence of altitudes that includes 50 feet for the first ten minutes of the flight or for the first eighty meters of the flight, 96 feet for the next six minutes of the flight or for the next fifty-five meters of the flight, and so on; yet another sequence of altitudes that includes 70 feet for the first twenty minutes of the flight or for the first sixty meters of the flight, 45 feet for the next seventeen minutes of the flight or for the next thirty-seven meters of the flight, and so on; etc.), and may run the model(s) on each of these altitude time series to estimate the number of and/or the frequency of handovers that might be triggered for the aerial UE 207 for a portion or an entirety of the duration of its flight.

As shown by reference number 268, the height-based management platform 202 may select a particular altitude or altitude time series for the aerial UE 207 that is associated with fewer or less frequent handovers. In exemplary embodiments, the height-based management platform 202 may then cause the aerial UE 207 (e.g., by instructing a serving cell of, or a ground station associated with, the aerial UE 207 to command the aerial UE 207) to fly according to the particular altitude or altitude time series. As shown by reference number 269, the aerial UE 207 may then conduct its flight according to the particular altitude or the altitude time series.

In one or more embodiments, the height-based management platform 202 may select the optimum altitude or altitude time series—i.e., the altitude or altitude time series that yields the lowest number of and/or a lowest frequency of height-based handover events—as the particular altitude or altitude time series. In other embodiments, the height-based management platform 202 may select the second best altitude or altitude time series—i.e., the altitude or altitude time series that yields the second lowest number of and/or a second lowest frequency of height-based handover events—as the particular altitude or altitude time series. It is to be understood and appreciated that the height-based management platform 202 may be configured to select the particular altitude or altitude time series according to any criteria (e.g., any threshold of handover reductions), with the aim of reducing the number of and/or a frequency of height-based handover events. For instance, the height-based management platform 202 may be configured to select the altitude or altitude time series so long as it would result in much fewer and/or much less frequent handovers than would otherwise be the case if the aerial UE were to simply conduct the flight according to pre-planned flight parameters derived without the aid of the height-based management platform 202. As an example, the height-based management platform 202 may be configured to select any altitude or altitude time series that yields at least a 50% reduction in the number of height-based handover events. Here, in a case where the height-based management platform 202 determines that default pre-planned flight parameters dictate that the aerial UE fly at a constant altitude of 55 feet during a flight, that such a constant altitude would result in sixteen handovers over the course of the flight, and that a certain altitude time series (e.g., 80 feet for the first three minutes, 100 feet for the next ten minutes, and so on) would result in only seven or eight handovers, the height-based management platform 202 may select that certain altitude time series for the aerial UE to use for its flight.

Identifying an altitude or altitude time series that can reduce the number of and/or frequency of handovers for the aerial UE advantageously reduces signaling overhead as well as battery power consumption for the aerial UE, thereby improving network performance and aerial UE operational efficiency.

While the functionality described above with respect to FIG. 2D has been described as being mainly performed by the height-based management platform 202, it is to be understood and appreciated that other systems may alternatively be configured to perform some or all of these functions. For instance, in certain alternative embodiments, a ground station that generates the flight plan for a given aerial UE may perform some or all of such functions (e.g., with or without coordination with the height-based management platform 202).

Furthermore, in some embodiments, selection of an appropriate altitude or altitude time series for the aerial UE may factor in other considerations, such as the terrain or environmental characteristics (e.g., how tall surrounding buildings are, weather conditions, etc.) that might add restrictions on how low the aerial UE may fly.

In certain embodiments, one or more of the aforementioned steps of FIG. 2D may be performed (e.g., only) in relation to those cells that are determined to be capable of supporting aerial UEs—e.g., that are capable of providing network coverage to aerial UEs.

It is to be understood and appreciated that the quantity and arrangement of networks, platforms, systems, controllers, non-aerial UEs, nodes, devices, and aerial UEs shown in FIGS. 2A, 2C, and/or 2D are provided as an example. In practice, there may be additional networks, platforms, systems, controllers, non-aerial UEs, nodes, devices, and/or aerial UEs, fewer networks, platforms, systems, controllers, non-aerial UEs, nodes, devices, and/or aerial UEs, different networks, platforms, systems, controllers, non-aerial UEs, nodes, devices, and/or aerial UEs, or differently arranged networks, platforms, systems, controllers, non-aerial UEs, nodes, devices, and/or aerial UEs than those shown in FIGS. 2A, 2C, and/or 2D. For example, the system(s) of FIGS. 2A, 2C, and/or 2D can include more or fewer networks, platforms, systems, controllers, non-aerial UEs, nodes, devices, and/or aerial UEs, etc. In practice, therefore, there can be hundreds, thousands, millions, billions, etc. of such networks, platforms, systems, controllers, non-aerial UEs, nodes, devices, and/or aerial UEs. In this way, example systems of FIGS. 2A, 2C, and/or 2D can coordinate, or operate in conjunction with, a set of networks, platforms, systems, controllers, non-aerial UEs, nodes, devices, and/or aerial UEs and/or operate on data sets that cannot be managed manually or objectively by a human actor. Furthermore, two or more networks, platforms, systems, controllers, non-aerial UEs, nodes, devices, or aerial UEs shown in FIGS. 2A, 2C, and/or 2D may be implemented within a single network, platform, system, controller, non-aerial UE, node, device, or aerial UE, or a single network, platform, system, controller, non-aerial UE, node, device, or aerial UE shown in FIGS. 2A, 2C, and/or 2D may be implemented as multiple networks, platforms, systems, controllers, non-aerial UEs, nodes, devices, or aerial UEs. Additionally, or alternatively, a set of networks, platforms, systems, controllers, non-aerial UEs, nodes, devices, or aerial UEs of the system(s) of FIGS. 2A, 2C, and/or 2D may perform one or more functions described as being performed by another set of networks, platforms, systems, controllers, non-aerial UEs, nodes, devices, or aerial UEs of the system(s) of FIGS. 2A, 2C, and/or 2D.

It is also to be understood and appreciated that, although each of FIGS. 2A, 2C, and/or 2D is described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

FIG. 2E depicts an illustrative embodiment of a method 270 in accordance with various aspects described herein. In some embodiments, one or more process blocks of FIG. 2E can be performed by a height-based management platform, such as the height-based management platform 202. In some embodiments, one or more process blocks of FIG. 2E may be performed by another device or a group of devices separate from or including the height-based management platform, such as a network node, an aerial UE, and/or the like.

At 271, the method can include identifying a first plurality of cells that are located within a first threshold distance from one or more locations in a designated area. For example, the height-based management platform 202 can, similar to that described above with respect to the system 200 of FIG. 2A, perform one or more operations that include identifying a first plurality of cells that are located within a first threshold distance from one or more locations in a designated area.

At 272, the method can include, for each cell of the first plurality of cells, defining a respective height threshold that is less than a determined minimum supported aerial user equipment (UE) altitude. For example, the height-based management platform 202 can, similar to that described above with respect to the system 200 of FIG. 2A, perform one or more operations that include, for each cell of the first plurality of cells, defining a respective height threshold that is less than a determined minimum supported aerial user equipment (UE) altitude.

At 273, the method can include, based on detecting that an aerial UE has transmitted, to a serving cell, a height-based measurement report that includes information regarding neighboring cells of the serving cell, obtaining data regarding height thresholds associated with the neighboring cells, wherein one or more of the neighboring cells is included in the first plurality of cells. For example, the height-based management platform 202 can, similar to that described above with respect to the system 200 of FIG. 2A, perform one or more operations that include, based on detecting that an aerial UE has transmitted, to a serving cell, a height-based measurement report that includes information regarding neighboring cells of the serving cell, obtaining data regarding height thresholds associated with the neighboring cells, wherein one or more of the neighboring cells is included in the first plurality of cells.

At 274, the method can include determining that each of the one or more of the neighboring cells has a height threshold that is less than the determined minimum supported aerial UE altitude. For example, the height-based management platform 202 can, similar to that described above with respect to the system 200 of FIG. 2A, perform one or more operations that include determining that each of the one or more of the neighboring cells has a height threshold that is less than the determined minimum supported aerial UE altitude.

At 275, the method can include performing an action to prevent each of the one or more of the neighboring cells from being a handover target cell for the aerial UE, thereby facilitating adjustment of a flight trajectory of the aerial UE such that the aerial UE avoids approaching the designated area. For example, the height-based management platform 202 can, similar to that described above with respect to the system 200 of FIG. 2A, perform one or more operations that include performing an action to prevent each of the one or more of the neighboring cells from being a handover target cell for the aerial UE, thereby facilitating adjustment of a flight trajectory of the aerial UE such that the aerial UE avoids approaching the designated area.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2F depicts an illustrative embodiment of a method 280 in accordance with various aspects described herein. In some embodiments, one or more process blocks of FIG. 2F can be performed by a height-based management platform, such as the height-based management platform 202. In some embodiments, one or more process blocks of FIG. 2F may be performed by another device or a group of devices separate from or including the height-based management platform, such as a network node, an aerial UE, and/or the like.

At 281, the method can include receiving information regarding an aerial user equipment (UE), the aerial UE being communicatively coupled with a network node. For example, the height-based management platform 202 can, similar to that described above with respect to the system of FIG. 2C, perform one or more operations that include receiving information regarding an aerial user equipment (UE), the aerial UE being communicatively coupled with a network node.

At 282, the method can include obtaining data associated with the network node that correlates aerial UE altitude values with signal quality levels, probabilities of connectivity disruption, or a combination thereof. For example, the height-based management platform 202 can, similar to that described above with respect to the system of FIG. 2C, perform one or more operations that include obtaining data associated with the network node that correlates aerial UE altitude values with signal quality levels, probabilities of connectivity disruption, or a combination thereof.

At 283, the method can include determining a conservative height threshold and an aggressive height threshold for the network node based on the data associated with the network node, wherein the conservative height threshold is lower than the aggressive height threshold. For example, the height-based management platform 202 can, similar to that described above with respect to the system of FIG. 2C, perform one or more operations that include determining a conservative height threshold and an aggressive height threshold for the network node based on the data associated with the network node, wherein the conservative height threshold is lower than the aggressive height threshold.

At 284, the method can include analyzing the information regarding the aerial UE. For example, the height-based management platform 202 can, similar to that described above with respect to the system of FIG. 2C, perform one or more operations that include analyzing the information regarding the aerial UE.

At 285, the method can include, based on the analyzing, selecting either the conservative height threshold or the aggressive height threshold for the network node to use for the aerial UE, resulting in a selected height threshold, wherein the selected height threshold affects a frequency or likelihood of height based trigger events for the aerial UE. For example, the height-based management platform 202 can, similar to that described above with respect to the system of FIG. 2C, perform one or more operations that include, based on the analyzing, selecting either the conservative height threshold or the aggressive height threshold for the network node to use for the aerial UE, resulting in a selected height threshold, wherein the selected height threshold affects a frequency or likelihood of height based trigger events for the aerial UE.

At 286, the method can include causing the network node to include the selected height threshold in height-based measurement report settings for the aerial UE. For example, the height-based management platform 202 can, similar to that described above with respect to the system of FIG. 2C, perform one or more operations that include causing the network node to include the selected height threshold in height-based measurement report settings for the aerial UE.

While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 2G depicts an illustrative embodiment of a method 290 in accordance with various aspects described herein. In some embodiments, one or more process blocks of FIG. 2G can be performed by a height-based management platform, such as the height-based management platform 202. In some embodiments, one or more process blocks of FIG. 2G may be performed by another device or a group of devices separate from or including the height-based management platform, such as a network node, an aerial UE, and/or the like.

At 291, the method can include identifying a plurality of cells that are located within a threshold distance from one or more points of a planned flight trajectory of an aerial user equipment (UE). For example, the height-based management platform 202 can, similar to that described above with respect to the system of FIG. 2D, perform one or more operations that include identifying a plurality of cells that are located within a threshold distance from one or more points of a planned flight trajectory of an aerial user equipment (UE).

At 292, the method can include determining, for each cell of the plurality of cells, a height threshold previously defined for that cell, resulting in a plurality of height thresholds. For example, the height-based management platform 202 can, similar to that described above with respect to the system of FIG. 2D, perform one or more operations that include determining, for each cell of the plurality of cells, a height threshold previously defined for that cell, resulting in a plurality of height thresholds.

At 293, the method can include, for each of one or more altitudes or one or more altitude time series, estimating a number of handovers or a frequency of handovers that might be triggered for the aerial UE due to height-based handover events along the planned flight trajectory, wherein the estimating is based on the plurality of height thresholds. For example, the height-based management platform 202 can, similar to that described above with respect to the system of FIG. 2D, perform one or more operations that include, for each of one or more altitudes or one or more altitude time series, estimating a number of handovers or a frequency of handovers that might be triggered for the aerial UE due to height-based handover events along the planned flight trajectory, wherein the estimating is based on the plurality of height thresholds.

At 294, the method can include, based on the estimating, selecting a particular altitude for the aerial UE from the one or more altitudes or selecting a particular altitude time series for the aerial UE from the one or more altitude time series, resulting in a selection. For example, the height-based management platform 202 can, similar to that described above with respect to the system of FIG. 2D, perform one or more operations that include, based on the estimating, selecting a particular altitude for the aerial UE from the one or more altitudes or selecting a particular altitude time series for the aerial UE from the one or more altitude time series, resulting in a selection.

At 295, the method can include causing the aerial UE to conduct a flight in accordance with the selection. For example, the height-based management platform 202 can, similar to that described above with respect to the system of FIG. 2D, perform one or more operations that include causing the aerial UE to conduct a flight in accordance with the selection.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
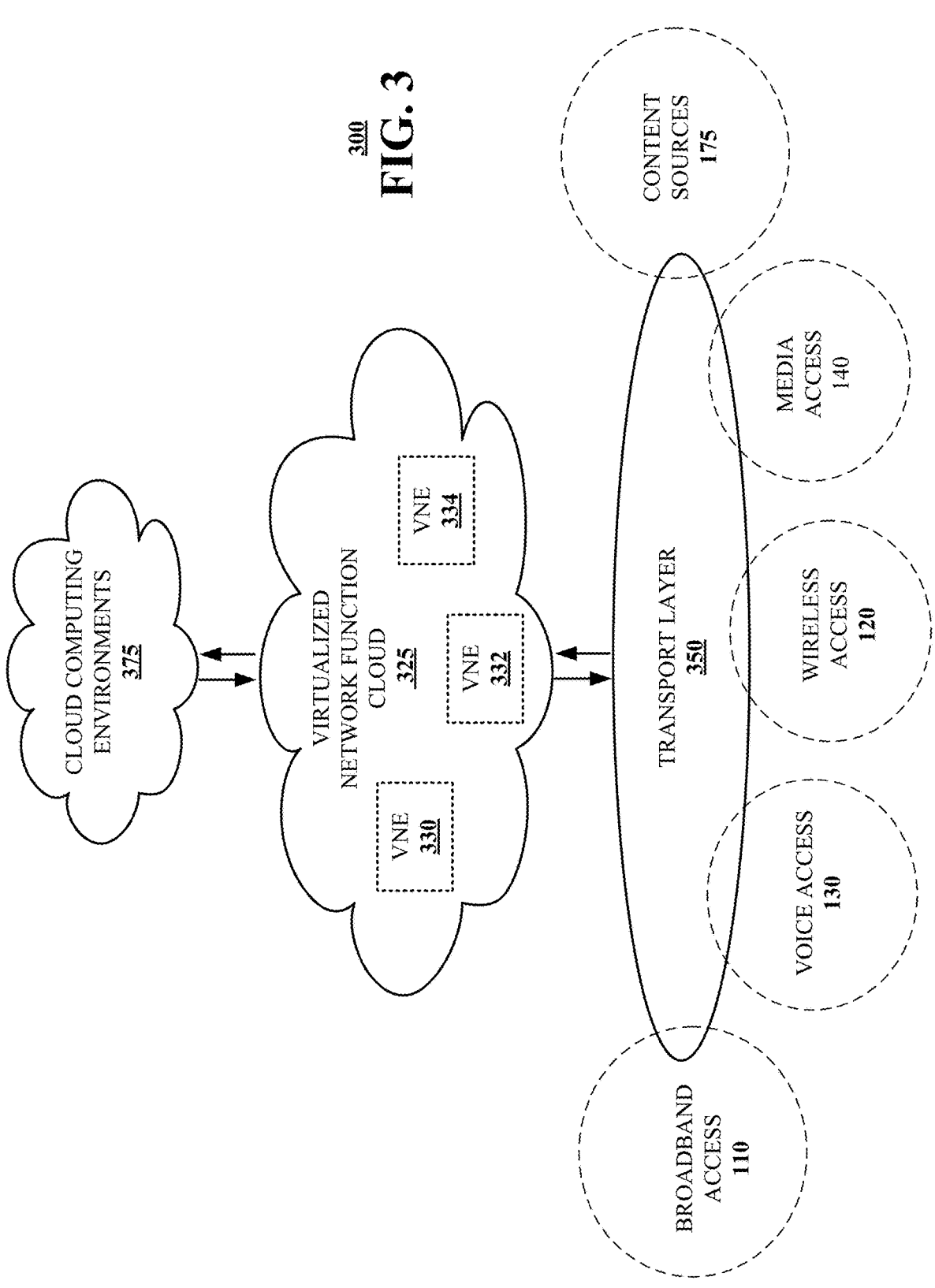
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and methods 270, 280, and 290 presented in FIGS. 1, 2A, and 2C-2G. For example, virtualized communications network 300 can facilitate, in whole or in part, defining of geofences via height threshold adjustments, customizing of height-based measurement report settings for aerial UEs, and/or setting of aerial UE altitudes to improve device/network performance.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332. 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
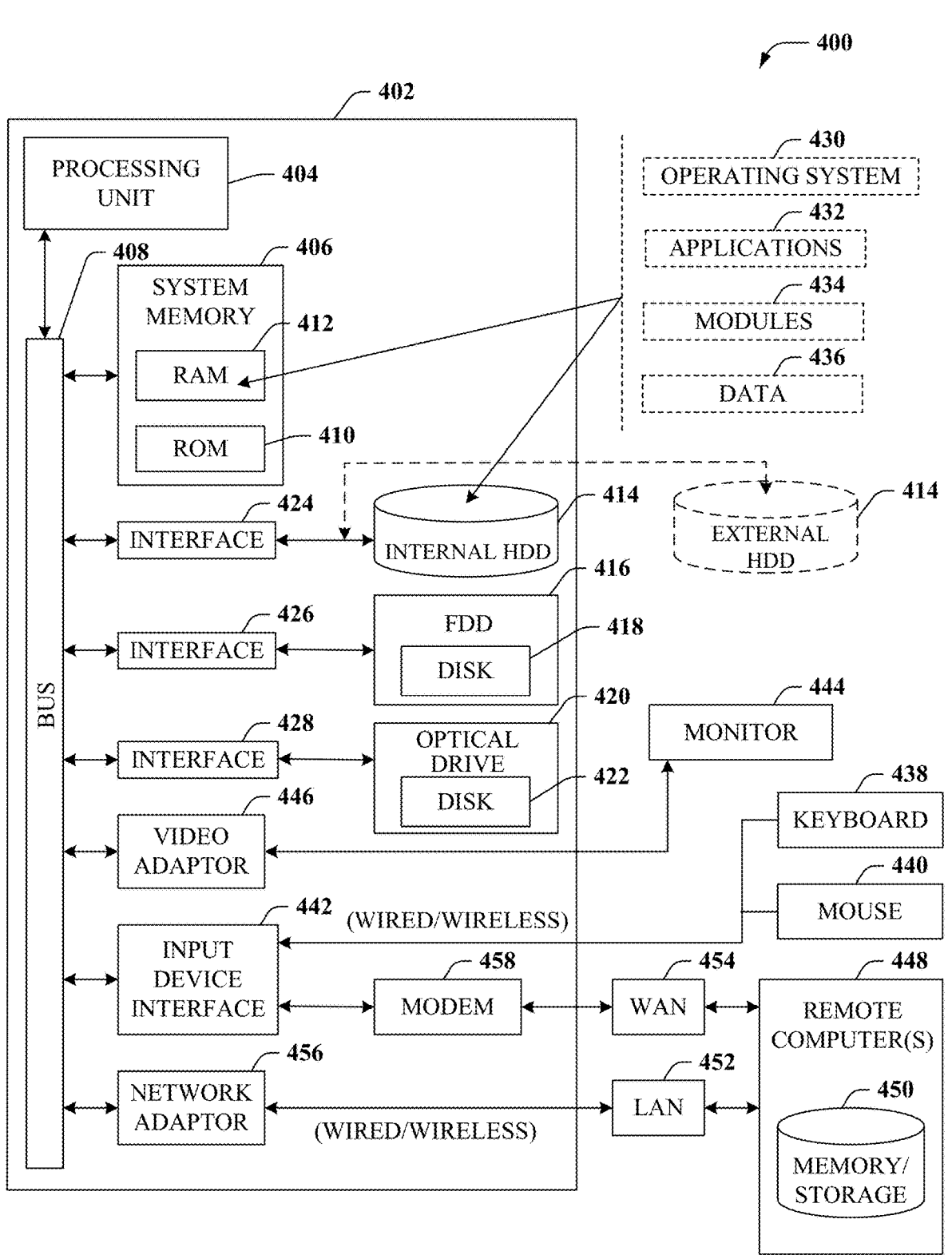
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, defining of geofences via height threshold adjustments, customizing of height-based measurement report settings for aerial UEs, and/or setting of aerial UE altitudes to improve device/network performance.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
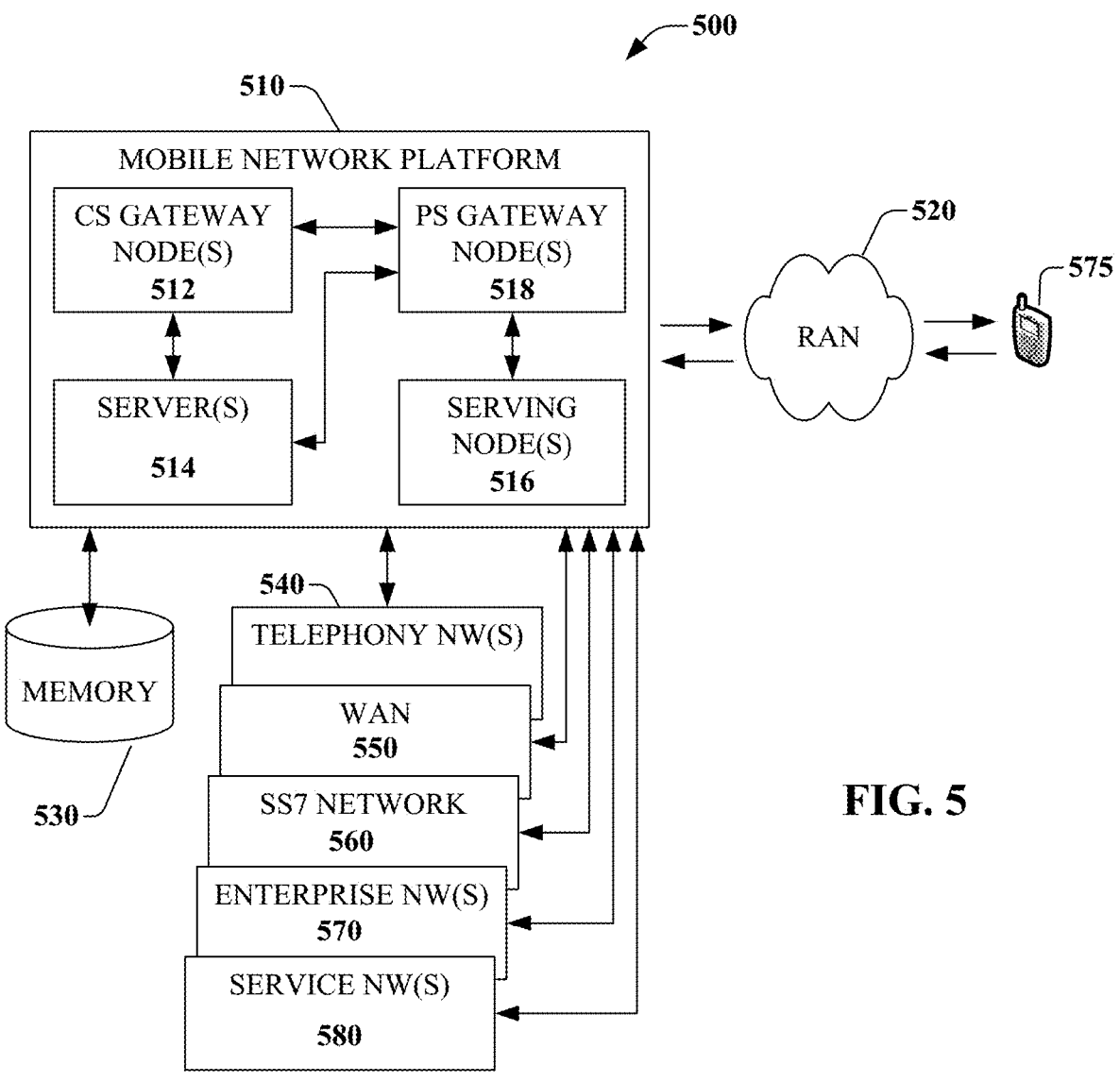
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, defining of geofences via height threshold adjustments, customizing of height-based measurement report settings for aerial UEs, and/or setting of aerial UE altitudes to improve device/network performance. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact.

Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
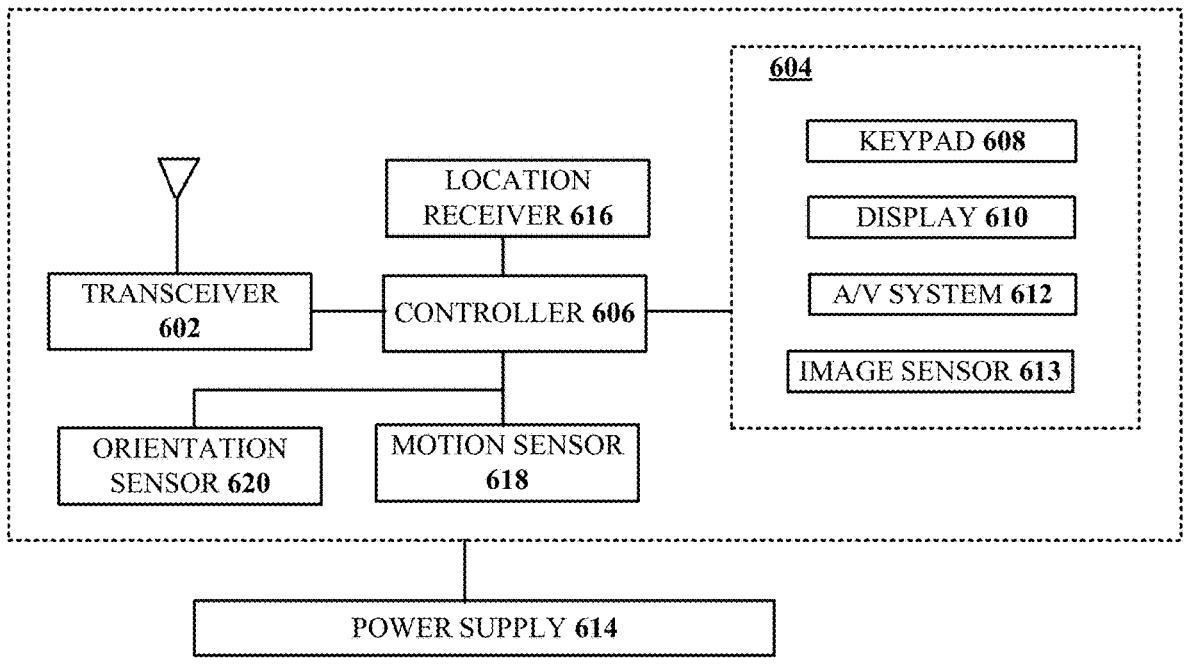
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, defining of geofences via height threshold adjustments, customizing of height-based measurement report settings for aerial UEs, and/or setting of aerial UE altitudes to improve device/network performance.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/ GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f (x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to." "coupled to." and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

identifying a first plurality of cells that are located within a first threshold distance from one or more locations in a designated area;

for each cell of the first plurality of cells, defining a respective height threshold that is less than a determined minimum supported aerial user equipment (UE) altitude;

based on detecting that an aerial UE has transmitted, to a serving cell, a height-based measurement report that includes information regarding neighboring cells of the serving cell, obtaining data regarding height thresholds associated with the neighboring cells, wherein one or more of the neighboring cells is included in the first plurality of cells;

determining that each of the one or more of the neighboring cells has a height threshold that is less than the determined minimum supported aerial UE altitude; and performing an action to prevent each of the one or more of the neighboring cells from being a handover target cell for the aerial UE, thereby facilitating adjustment of a flight trajectory of the aerial UE such that the aerial UE avoids approaching the designated area.

2. The device of claim 1, wherein the designated area comprises a restricted area, and wherein the first plurality of cells are each capable of supporting aerial UE operations.

3. The device of claim 1, wherein the respective height threshold for each cell of the first plurality of cells is also less than a default height threshold associated with that cell.

4. The device of claim 1, wherein the determined minimum supported aerial UE altitude is based on:

information regarding an environment or surroundings of one or more of the first plurality of cells;

manufacturer specification data relating to the aerial UE or one or more other aerial UEs;

flight plan or flight trajectory information associated with the aerial UE or one or more other aerial UEs; or a combination thereof.

5. The device of claim 1, wherein the defining the respective height threshold for each cell of the first plurality of cells results in a first geofence formed about the designated area.

6. The device of claim 5, wherein a second plurality of cells are located beyond the first threshold distance but within a second threshold distance from the one or more locations in the designated area, and wherein the operations further comprise, for each cell of the second plurality of cells, defining a particular height threshold that is less than the determined minimum supported aerial UE altitude but that is greater the respective height threshold defined for each cell of the first plurality of cells, thereby forming a second geofence about the designated area that is less restrictive than the first geofence.

7. The device of claim 1, wherein the operations further comprise obtaining at least a portion of the height-based measurement report from the serving cell.

8. The device of claim 1, wherein the aerial UE obtains data regarding a height threshold of the serving cell upon attachment of the aerial UE to the serving cell, and wherein the aerial UE transmits the height-based measurement report to the serving cell based on the aerial UE detecting that an altitude of the aerial UE is greater than or equal to the height threshold of the serving cell.

9. The device of claim 1, wherein other cells of the neighboring cells are not included in the first plurality of cells, and wherein the operations further comprise determining that each of the other cells of the neighboring cells has a height threshold that is greater than or equal to the determined minimum supported aerial UE altitude, and permitting each of the other cells of the neighboring cells to be a handover target cell for the aerial UE.

10. The device of claim 1, wherein the device comprises or is implemented in a multi-access edge computing (MEC) device, a radio access network (RAN) intelligent controller (RIC), or a Self-Organizing Network (SON).

11. A method, comprising:

identifying, by a processing system including a processor, a network node that is located within a threshold distance from one or more locations in a restricted area;

defining, by the processing system, a height threshold for the network node that is less than a determined minimum supported aerial user equipment (UE) altitude;

detecting, by the processing system, that an aerial UE has experienced a height-based trigger event in relation to a serving cell of the aerial UE;

based on the detecting, identifying, by the processing system, a neighboring network node of the serving cell and determining that the neighboring network node of the serving cell is the network node that is located within the threshold distance from the one or more locations in the restricted area; and based on the determining, blacklisting, by the processing system, the neighboring network node from being a candidate handover target for the aerial UE.

12. The method of claim 11, wherein the determined minimum supported aerial UE altitude is based on:

information regarding an environment or surroundings of one or more network nodes;

manufacturer specification data relating to the aerial UE or one or more other aerial UEs;

flight plan or flight trajectory information associated with the aerial UE or one or more other aerial UEs; or combination thereof.

13. The method of claim 11, wherein the height threshold is also less than a default height threshold that was previously defined for the network node.

14. The method of claim 11, wherein the aerial UE comprises an uncrewed aerial vehicle (UAV) or a drone.

15. The method of claim 11, wherein the identifying the neighboring network node of the serving cell is based on a cell ID included in a height-based measurement report that is transmitted by the aerial UE to the serving cell as a result of the height-based trigger event.

16. A non-transitory machine-readable medium, comprising executable instructions that, when executed by a processing system of an aerial user equipment (UE) including a processor, facilitate performance of operations, the operations comprising:

identifying a first plurality of cells that are located within a first threshold distance from one or more locations in a designated area;

for each cell of the first plurality of cells, defining a respective height threshold that is less than a determined minimum supported aerial user equipment (UE) altitude;

based on detecting that an aerial UE has transmitted, to a serving cell, a height-based measurement report that includes information regarding neighboring cells of the serving cell, obtaining data regarding height thresholds associated with the neighboring cells, wherein one or more of the neighboring cells is included in the first plurality of cells;

determining that each of the one or more of the neighboring cells has a height threshold that is less than the determined minimum supported aerial UE altitude; and preventing each of the one or more of the neighboring cells from being a handover target cell for the aerial UE, thereby facilitating adjustment of a flight trajectory of the aerial UE such that the aerial UE avoids approaching the designated area.

17. The non-transitory machine-readable medium of claim 16, wherein the designated area comprises a restricted area, and wherein the first plurality of cells are each capable of supporting aerial UE operations.

18. The non-transitory machine-readable medium of claim 16, wherein the respective height threshold for each cell of the first plurality of cells is also less than a default height threshold associated with that cell.

19. The non-transitory machine-readable medium of claim 16, wherein the determined minimum supported aerial UE altitude is based on:

information regarding an environment or surroundings of one or more of the first plurality of cells;

manufacturer specification data relating to the aerial UE or one or more other aerial UEs;

flight plan or flight trajectory information associated with the aerial UE or one or more other aerial UEs; or combination thereof.

20. The non-transitory machine-readable medium of claim 16, wherein the defining the respective height threshold for each cell of the first plurality of cells results in a first geofence formed about the designated area.

\* \* \* \* \*